United States Patent
Roden et al.

(10) Patent No.: US 11,518,253 B2
(45) Date of Patent: Dec. 6, 2022

(54) ELECTRIC DRIVER FOR WHEELED GROUND SURFACE MODIFYING MACHINE

(71) Applicant: Graco Minnesota Inc., Minneapolis, MN (US)

(72) Inventors: Joshua D. Roden, Blaine, MN (US); Tyler J. Kruzel, Otsego, MN (US); James C. Schroeder, Ramsey, MN (US); Mark D. Shultz, Fridley, MN (US); David M. Larsen, Albertville, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 424 days.

(21) Appl. No.: 16/689,829

(22) Filed: Nov. 20, 2019

(65) Prior Publication Data

US 2020/0164752 A1 May 28, 2020

Related U.S. Application Data

(60) Provisional application No. 62/771,704, filed on Nov. 27, 2018.

(51) Int. Cl.
*B60L 15/20* (2006.01)
*B60L 50/60* (2019.01)
(Continued)

(52) U.S. Cl.
CPC .............. *B60L 15/20* (2013.01); *B60D 1/488* (2013.01); *B60K 26/02* (2013.01); *B60L 50/66* (2019.02);
(Continued)

(58) Field of Classification Search
None
See application file for complete search history.

(56) References Cited

U.S. PATENT DOCUMENTS 2,511,692 A 6/1950 Brown
2,867,449 A 1/1959 Shawver
(Continued)

FOREIGN PATENT DOCUMENTS

GB 2195301 A 4/1988
WO WO2013009323 A2 1/2013

OTHER PUBLICATIONS

Communication Pursuant to Article 94(3) EPC for EP Application No. 19211777.8, dated Oct. 9, 2020, 4 pages.
(Continued)

*Primary Examiner* — Navid Z. Mehdizadeh
(74) *Attorney, Agent, or Firm* — Kinney & Lange, P.A.

(57) ABSTRACT

A battery powered driver for propelling a wheeled ground surface modifying machine includes at least one wheel contacting a ground surface, a battery powered electric motor, control circuitry configured to manage delivery of electrical battery power to the electric motor to control a sped of the driver, at least one pedal attached to a pedal axle and tiltable in each of a forward and rearward direction with respect to the pedal axle, and at least one pedal tilt sensor configured to output one or more signals to the control circuitry indicating a degree of tilt of the at least one pedal. The control circuitry is configured to control the electric motor to accelerate the driver forward based on the one or more signals indicating a forward tilt of the at least one pedal, the electrical battery power delivered to the electric motor for forward acceleration proportional to a degree of forward tilt of the at least one pedal, and to control the electric motor to accelerate the driver rearward based on the one or more signals indicating a rearward tilt of at least one pedal, the electrical battery power delivered to the electric motor for rearward acceleration proportional to a degree of rearward tilt of the at least one pedal.

19 Claims, 14 Drawing Sheets

(51) Int. Cl.
*B60D 1/48* (2006.01)
*B60K 26/02* (2006.01)

(52) U.S. Cl.
CPC ....... *B60L 2240/12* (2013.01); *B60L 2250/26* (2013.01); *B60Y 2400/61* (2013.01)

(56) References Cited

U.S. PATENT DOCUMENTS

| | | | |
|---|---|---|---|
| 2,895,279 | A | 7/1959 | Schrage |
| 3,161,994 | A | 12/1964 | Neitzer, Jr. |
| 3,995,569 | A | 12/1976 | Picardat |
| 4,077,731 | A | 3/1978 | Holz, Sr. et al. |
| 4,771,840 | A | 9/1988 | Keller |
| 5,033,564 | A | 7/1991 | Mattson |
| 5,114,268 | A | 5/1992 | Marcato |
| 5,718,534 | A | 2/1998 | Neuling |
| 6,003,625 | A | 12/1999 | Neuling |
| 6,357,232 | B1* | 3/2002 | Strashny .................. G05G 1/30 60/431 |
| 6,474,427 | B1 | 11/2002 | Tunnecliff |
| 6,575,819 | B2 | 6/2003 | Beyersdorff |
| 6,986,397 | B2 | 1/2006 | Mattson et al. |
| 7,032,694 | B2 | 4/2006 | Jessen |
| 7,735,587 | B1 | 6/2010 | Stahlnecker |
| 2003/0196841 | A1 | 10/2003 | Mattson et al. |
| 2003/0213626 | A1* | 11/2003 | Hafendorfer ........ B62D 11/001 180/6.48 |
| 2005/0115760 | A1* | 6/2005 | Sprinkle ................. F16H 61/47 180/338 |
| 2008/0106112 | A1* | 5/2008 | Shibaoka ................. G05G 1/30 296/71 |
| 2014/0064849 | A1 | 3/2014 | Arnold |
| 2017/0072989 | A1* | 3/2017 | Moujoud ............. B62D 31/006 |
| 2020/0062100 | A1* | 2/2020 | Chen ........................ G05G 1/30 |

OTHER PUBLICATIONS

Extended European Search Report for EP Application No. 19211777.8, dated Apr. 17, 2020, 9 pages.

Anonymous: "Graco LineDriver Ride-On Line 1-15 Striping System", from <http://web.archive.org/web/20170703222136/http://www.graco.com/de/de/products/contractor/emea-linedriver.htlm>, Jul. 3, 2017, 2 pages.

* cited by examiner

ELECTRIC DRIVER FOR WHEELED GROUND SURFACE MODIFYING MACHINE

CROSS-REFERENCE TO RELATED APPLICATION(S)

This application claims the benefit of U.S. Provisional Application No. 62/771,704, filed Nov. 27, 2018 for "ELECTRIC DRIVER FOR WHEELED GROUND SURFACE MODIFYING MACHINE" by J. Roden, T. Kruzel, and J. Schroeder.

BACKGROUND

The present invention relates to ground modifying machines. More particularly, the present invention relates to a driver for propelling wheeled ground surface modifying machines.

Ground surface modifying machines include line stripers and road surface grinding equipment (e.g., scarifies), amongst other machines for marking, removing, or otherwise conditioning ground surfaces. The ground surfaces can be asphalt, concrete, or other type of hard surface, such as a road or a parking lot. A line striper can be used for painting stripes on, for example, roads, parking lots, walkways, athletic fields, and indoor facilities. Conventional line striping systems with a driver include one or multiple combustion engines and a liquid fuel tank from which the engine draws the fuel (e.g., gasoline). The use of combustion engines limits the environments and situations in which line striping can be performed. For example, combustion engines emit fumes, making them undesirable for indoor striping, such as in sports arenas, warehouses, factories, and indoor parking facilities, amongst other locations. Also, combustion engines can be noisy and thus undesirable for striping at night in locations proximate residential areas. This can be a challenge because the most convenient time to stripe roads and parking lots is often at night when road/lot traffic is at a minimum.

SUMMARY

A battery powered driver for propelling a wheeled ground surface modifying machine includes at least one wheel contacting a ground surface, a battery powered electric motor, control circuitry configured to manage delivery of electrical battery power to the electric motor to control a sped of the driver, at least one pedal attached to a pedal axle and tiltable in each of a forward and rearward direction with respect to the pedal axle, and at least one pedal tilt sensor configured to output one or more signals to the control circuitry indicating a degree of tilt of the at least one pedal. The control circuitry is configured to control the electric motor to accelerate the driver forward based on the one or more signals indicating a forward tilt of the at least one pedal, the electrical battery power delivered to the electric motor for forward acceleration proportional to a degree of forward tilt of the at least one pedal, and to control the electric motor to accelerate the driver rearward based on the one or more signals indicating a rearward tilt of at least one pedal, the electrical battery power delivered to the electric motor for rearward acceleration proportional to a degree of rearward tilt of the at least one pedal.

DETAILED DESCRIPTION

The present invention is directed to an electronic driver for a ground surface modifying system.

Figure 1:
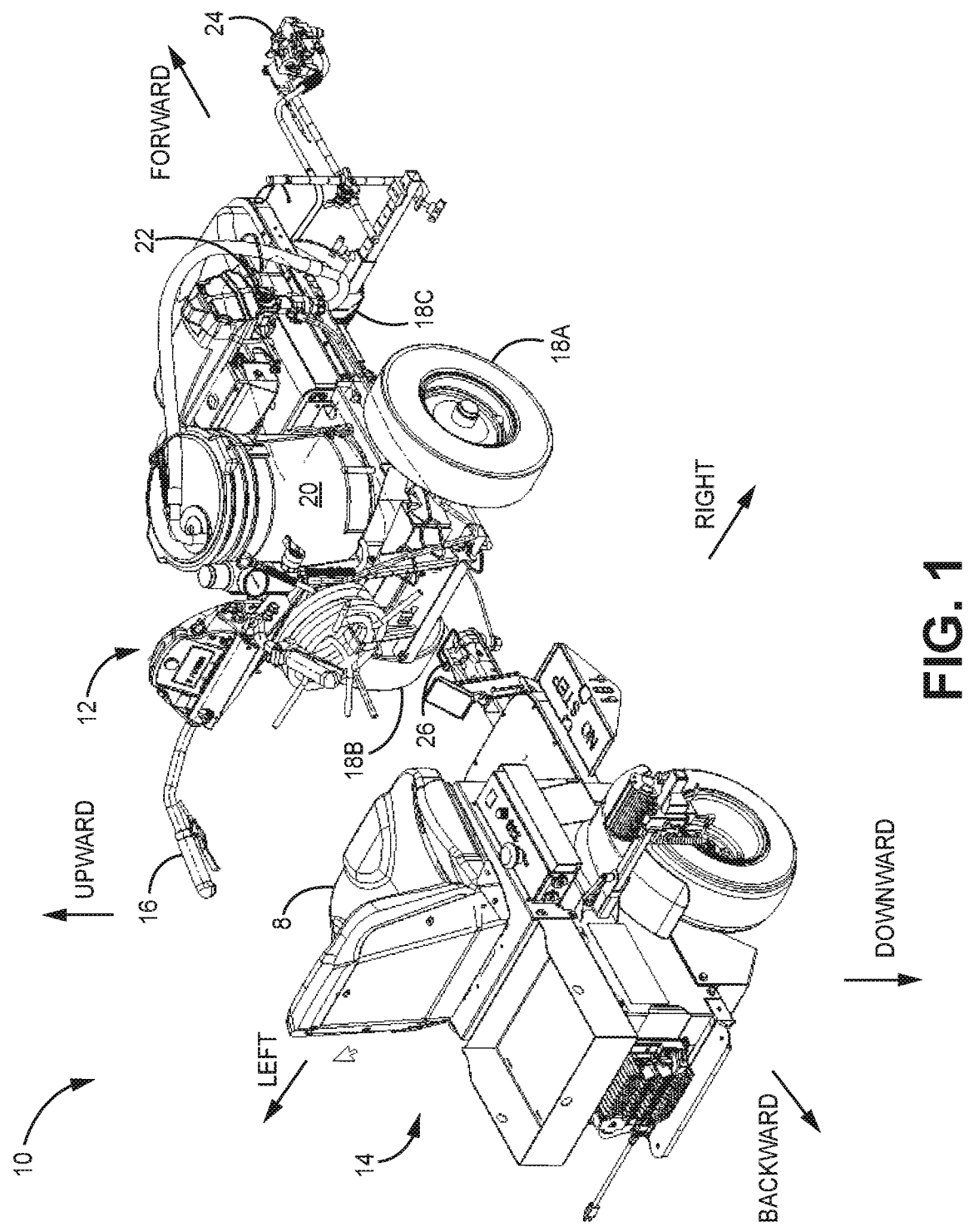
FIG. 1 is a perspective view of a ground surface modifying system including a ground surface modifying machine and a driver.

In FIG. 1 and elsewhere herein, a longitudinal axis is indicated by forward and backward directions ("backward", "back", "reverse" and "rear", or "forward" and "front" terms are used herein interchangeably). A lateral axis is indicated by left and right directions. A vertical axis is indicated by upward and downward directions ("upward", "up", "upper", and "top", or "downward", "down", "lower", and "bottom" terms are used herein interchangeably).

FIG. 1 is a perspective view of ground surface modifying system 10, which can be configured as a line striping system for applying paint to ground surfaces. Ground surface modifying system 10 includes ground surface modifying machine 12 and driver 14. Machine 12 includes steering mechanism 16 and wheels 18A, 18B, 18C, which facilitate the movement of machine 12 along the ground. More specifically, the operator can control the direction of machine 12 with steering mechanism 16, and wheels 18A, 18B, 18C allow machine 12 to ride along the ground. In the embodiment shown, steering mechanism 16 is a pair of handlebars, but in other embodiments, other mechanisms, such as a steering wheel, can be used. Similarly, other embodiments of machine 12 can include fewer or more than three wheels.

Machine 12 further includes reservoir 20, pump system 22, and dispenser 24. Reservoir 20 can be used to store paint or other materials. Pump system 22 can draw paint from reservoir 20 to spray or otherwise dispense from dispenser 24. Pump system 22 can be powered by a battery and operated by an electric motor, while dispenser 24 can be configured as a spray gun actuatable from steering mechanism 16 by, for example, a hand-controlled lever. In other embodiments, pump system 22 can be powered by a liquid fuel engine, or a combination of a liquid fuel engine and hydraulic pump. Although described herein as a line striping system, it should be understood that system 10 could instead be used to apply other materials (e.g., beads, flowable solids, pellets, coatings, solvents, water, oil, etc.) to ground surfaces, or can be configured to modify ground surfaces in other ways.

Machine 12, as shown, does not propel itself, and does not include a motor for rotating any of the wheels 18A, 18B, 18C. Instead, machine 12 must be pushed. If driver 14 is unattached to machine 12, then the operator can walk behind machine 12 to push machine 12 forward, and pull machine 12 backward, using steering mechanism 16. However, machine 12 can be fatiguing to push and maneuver during the duration of the project. Driver 14 is useful for propelling machine 12 forwards and backwards. To that end, machine 12 can be attached/secured to driver 14 by hitch 26. Hitch 26 can be the single point of mechanical contact between machine 12 and driver 14. Hitch 26 allows machine 12 to articulate relative to driver 14, such as for turning, while also being pushed by driver 14.

Figure 2:
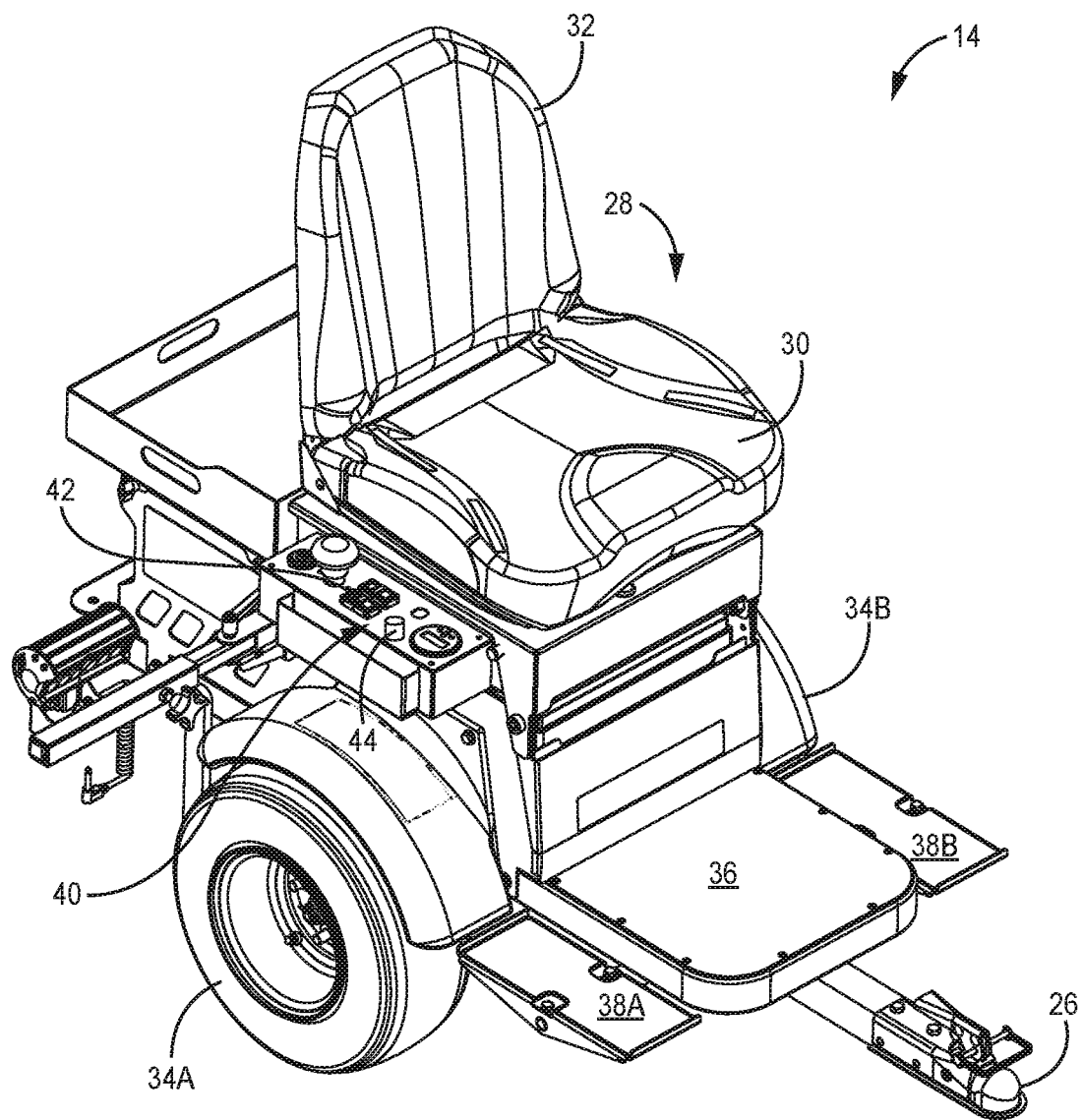
FIG. 2 is a perspective view of the driver of FIG. 1.

FIG. 2 is a perspective view of driver 14 shown isolated from machine 12. With continued reference to FIGS. 1 and 2, driver 14 further includes seat 28, wheels 34A, 34B, platform 36, pedals 38A, 38B, and interface panel 40. Seat 28 includes base portion 30 to support the weight of the operator, and upright back portion 32 to support the operator's back in a seated position. During operation of driver 14, seat can be positioned, as shown, with base portion 30 generally parallel to the ground surface, and with upright back portion generally perpendicular to base portion 30. In other embodiments of driver 14, upright back portion 32 may not be present. Seat 28 can be formed from padded material, such as foam. From seat 28, the operator's hands can reach steering mechanism 16 of machine 12 to steer and control machine 12 while driver 14 transmits forward and/or backward propelling force to machine 12 through hitch 26.

Wheels 34A, 34B can be inflated rubber tires, among other options. Although only two wheels 34A, 34B are shown, other embodiments of driver 14 can include a single wheel 34, or more than two wheels 34A, 34B (e.g., 34A, 34B, 34C, etc.). In the embodiment shown, driver 14 does not include any type of steering mechanism, such as a steering wheel or handle bars, for pivoting one of wheels 34A, 34B relative to the other to guide a turning maneuver. Rather, driver 14 relies on steering mechanism 16 of machine 12 to guide driver 14 through turning maneuvers while driver 14 pushes/pulls machine 12.

Platform 36 is positioned in front of and below seat 28. The operator may stand on platform 36 while mounting driver 14 or while resting during operation. Pedals 38A, 38B are mounted on either side of platform 36. Pedals 38A, 38B can be tilted forward and backward by the operator to control the movement of driver 14, as is discussed in greater detail below. Pedals 38-A, 38B can be mechanically linked to one another such that the tilting of one pedal causes the other to tilt as well. Although driver 14 is shown with two pedals 38A, 38B, other embodiments can include a single pedal 38 on either side of platform 36, or positioned elsewhere depending on the design of driver 14.

Interface panel 40 operates various functions of driver 14. More specifically, interface panel 40 includes speed control switch 42 for turning on/off a speed control function of driver 14, and speed control input 44 for adjusting a forward speed setting, all of which is discussed in greater detail below.

Figure 3:
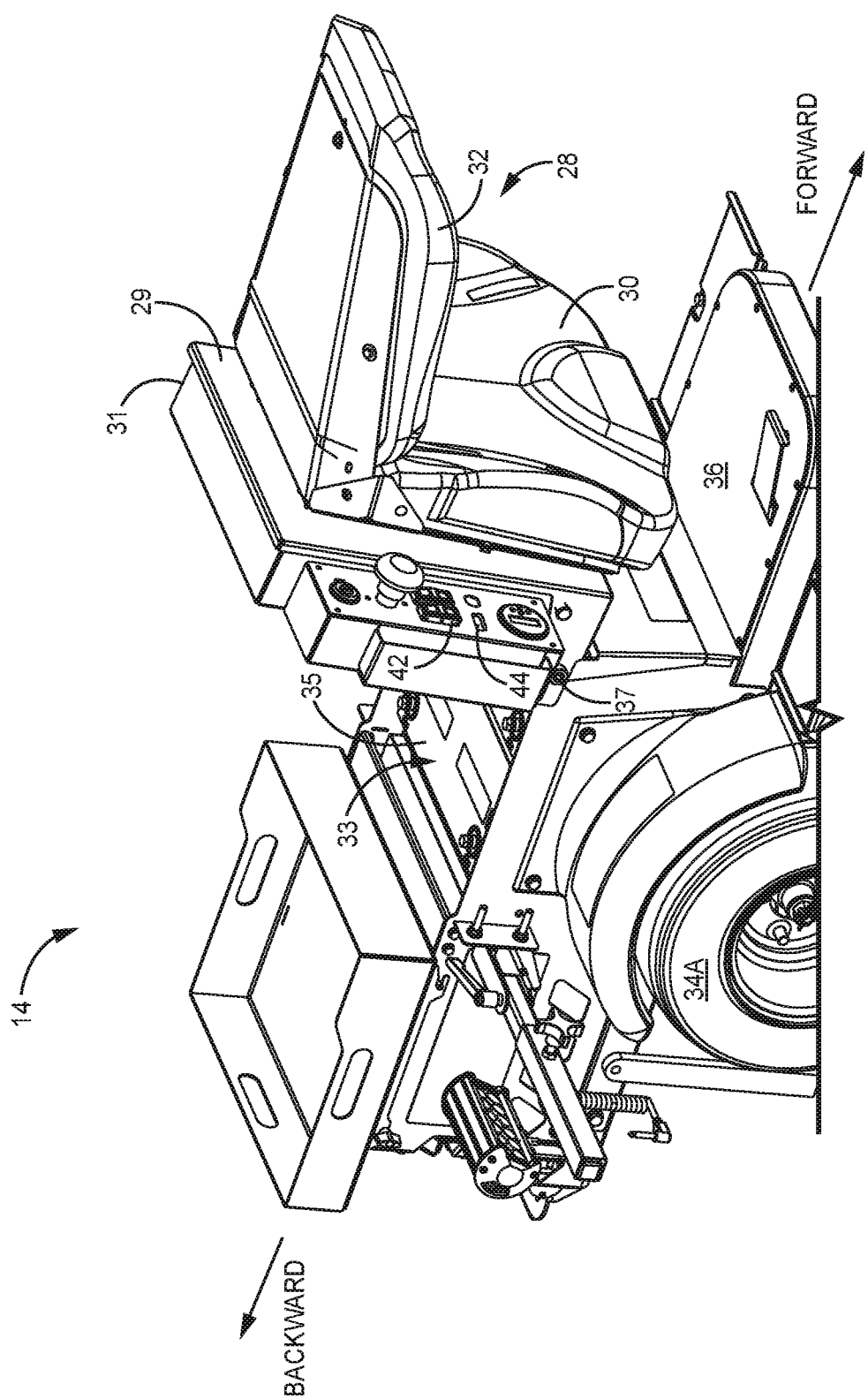
FIG. 3 is a perspective view of the driver showing the seat tilted forward.

FIG. 3 is a perspective view of driver 14 showing seat 28 tilted forward, which better illustrates seat mount 29, control box 31, battery bay 33, battery 35, and rotation point 37. As shown, seat 28 is mounted (on the side of base portion 30) on seat mount 29. Seat mount 29 is part of control box 31 that contains various control circuitry. The tilting of seat 28 exposes battery bay 33 containing one or more batteries 35. Battery 35 can be, for example, a lead acid or lithium ion battery, and can be used to power the various functions of driver 14 discussed herein. As shown in FIG. 3, seat 28 is titled forward at rotation point 37 near the forward end of seat 28, which can be configured as a movable fastener. Depending on the embodiment, rotation point 37 can be a bolt, rod, screw, hinge, etc. Seat 28 can additionally/alternatively be tilted to the rear or sides in other embodiments.

Figure 4:
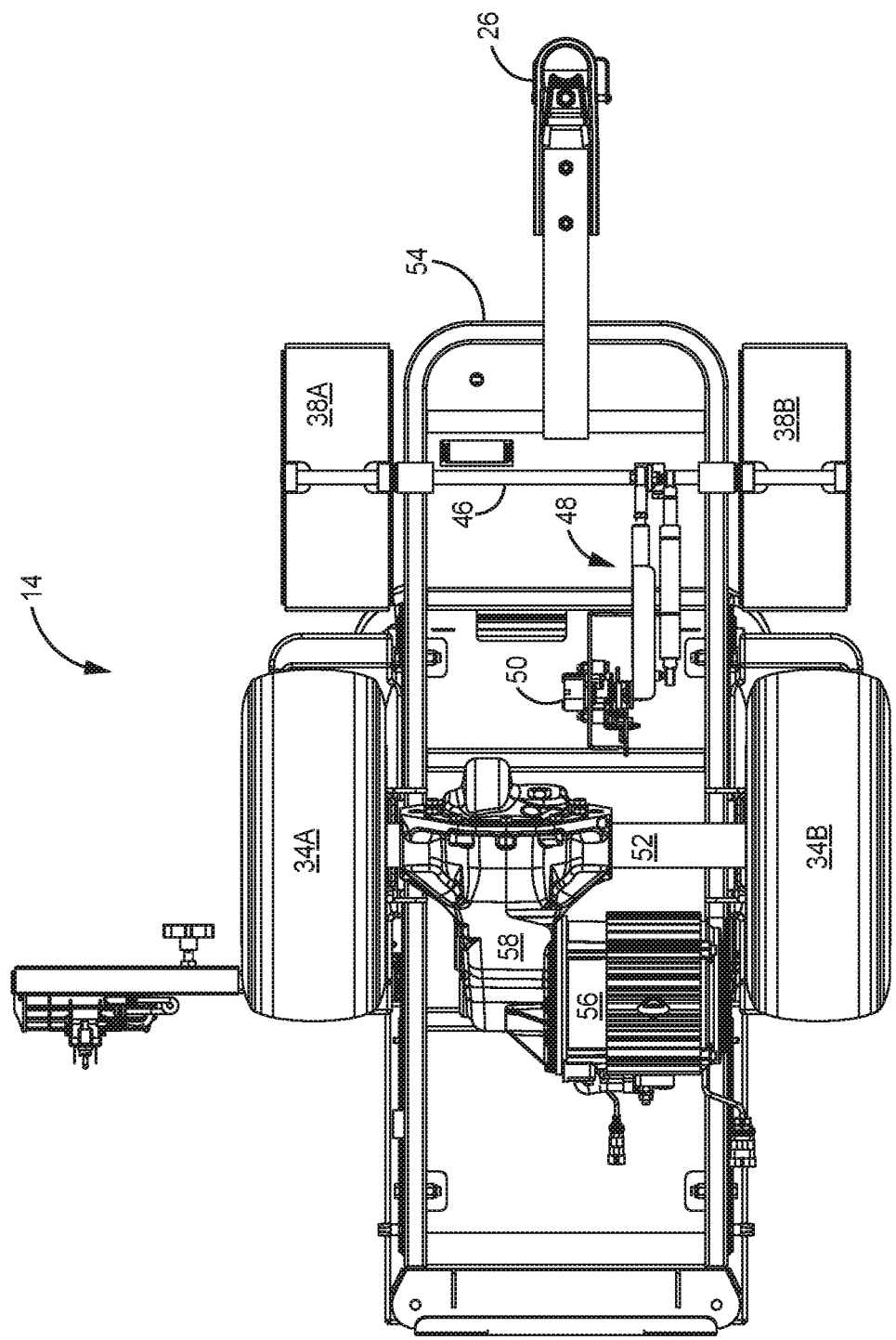
FIG. 4 is a plan view of the underside of the driver.

FIG. 4 is a view of the underside of driver 14 further showing pedal axle 46, mechanical motion control 48, pedal tilt sensor 50, wheel axle 52, frame 54, motor 56, and transaxle 58. As shown in FIG. 4, pedal axle 46 links pedals 38A, 38B. Pedal axle 46 can be a metal rod fixed to each of pedals 38A, 38B (e.g., using a clamping screw set) to transmit rotational motion from one pedal to the other. Mechanical motion control 48 is attached to pedal axle 46 and dampens motion of pedal axle 46 and thereby, the tilting motion of pedals 38A, 38B. Mechanical motion control 48 also transmits mechanical motion from pedal axle 46 to pedal tilt sensor 50, which measures the direction and degree of tilt of pedals 38A, 38B in order to determine the direction (i.e., forward or backward) and target speed of driver 14. Wheel axle 52 mechanically links wheels 34A, 34B, and is located below seat 28 and battery bay 33 (shown in FIG. 3). In some embodiments, wheel axle 52 can be arranged in multiple segments to allow for differential rotation of wheels 34A, 34B, such as for turning maneuvers. Wheels 34A, 34B support frame 54, while frame 54 supports the other components, directly or indirectly, of driver 14.

Motor 56 outputs rotational motion to transaxle 58. Transaxle 58 can include one or both of a transmission and differential in a single assembly, and can, for example, join the different segments of wheel axle 52. In the embodiment shown, motor 56 is an electric motor, such as an alternating current induction motor having a rotor and stator, each with one or more solenoids. Another suitable electric motor 56 can be a brushed or brushless direct current motor also with a rotor and stator. In other embodiments, motor 56 can be a gas-powered combustion motor.

Figure 5:
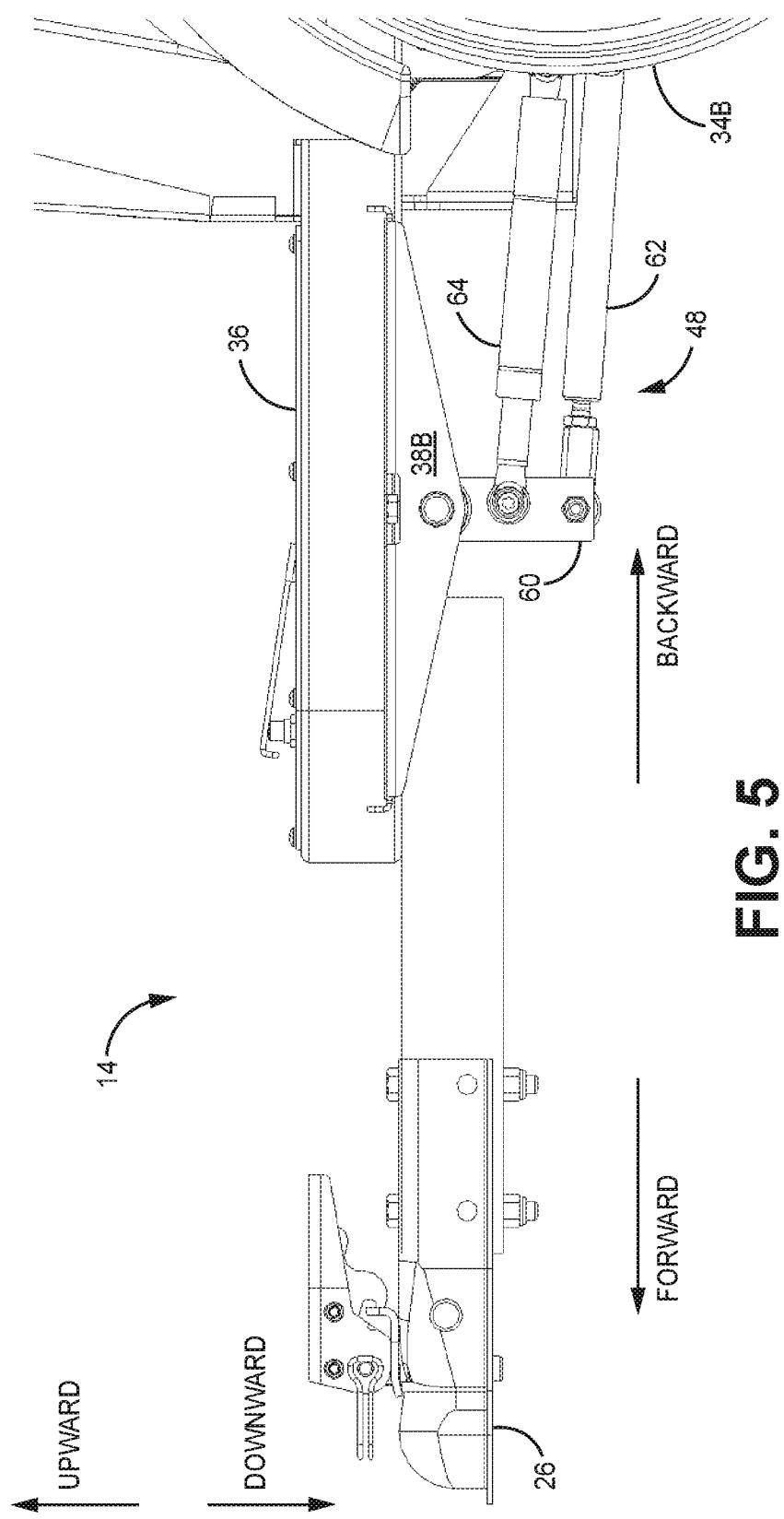
FIG. 5 is a left side view of a portion of the driver showing a pedal position.

FIG. 5 is a left side view of a portion of driver 14 forward of wheel 34B. As shown in FIG. 5, pedal 38B is in a generally horizontal position, such that it is level with the ground, and also parallel with the top surface of platform 36. In the embodiment shown, the horizontal position can correspond to a neutral position of driver 14, that is, a position that does not generate an input causing motor 56 to move driver 14 forward or backward, but rather to remain stationary or otherwise not accelerate. It should be noted that pedals 38A, 38B need not be perfectly horizontal to achieve a neutral setting, as is discussed in greater detail below. Tilting pedal 38B (and/or pedal 38A) such that the front end of pedal 38B moves downward while the back end moves upward equates to a forward tilt. Tilting pedal 38B (and/or pedal 38A) such that the front end of pedal 38B moves upward while the back end moves downward equates to a rearward (backward) tilt. The forward tilt and rearward tilt can cause a corresponding movement of driver 14, as is discussed in greater detail below. This manner of pedal tilting (i.e., forward to move forward and rearward to move backward) is advantageous in that it is intuitive for operators. The operator's hands are typically placed on steering mechanism 16 (FIG. 1), and are not usually available for speed control. Many ground striping projects involve equal amounts of driving in reverse and driving forward, particularly when striping parking lots where frequent forward and rearward motion is needed to paint the short lines of an array of parallel parking stalls. The operator can easily tilt either or both of pedals 38A, 38B forward and rearward using their feet to quickly and efficiently transition between forward and reverse propulsion.

Figure 6A:
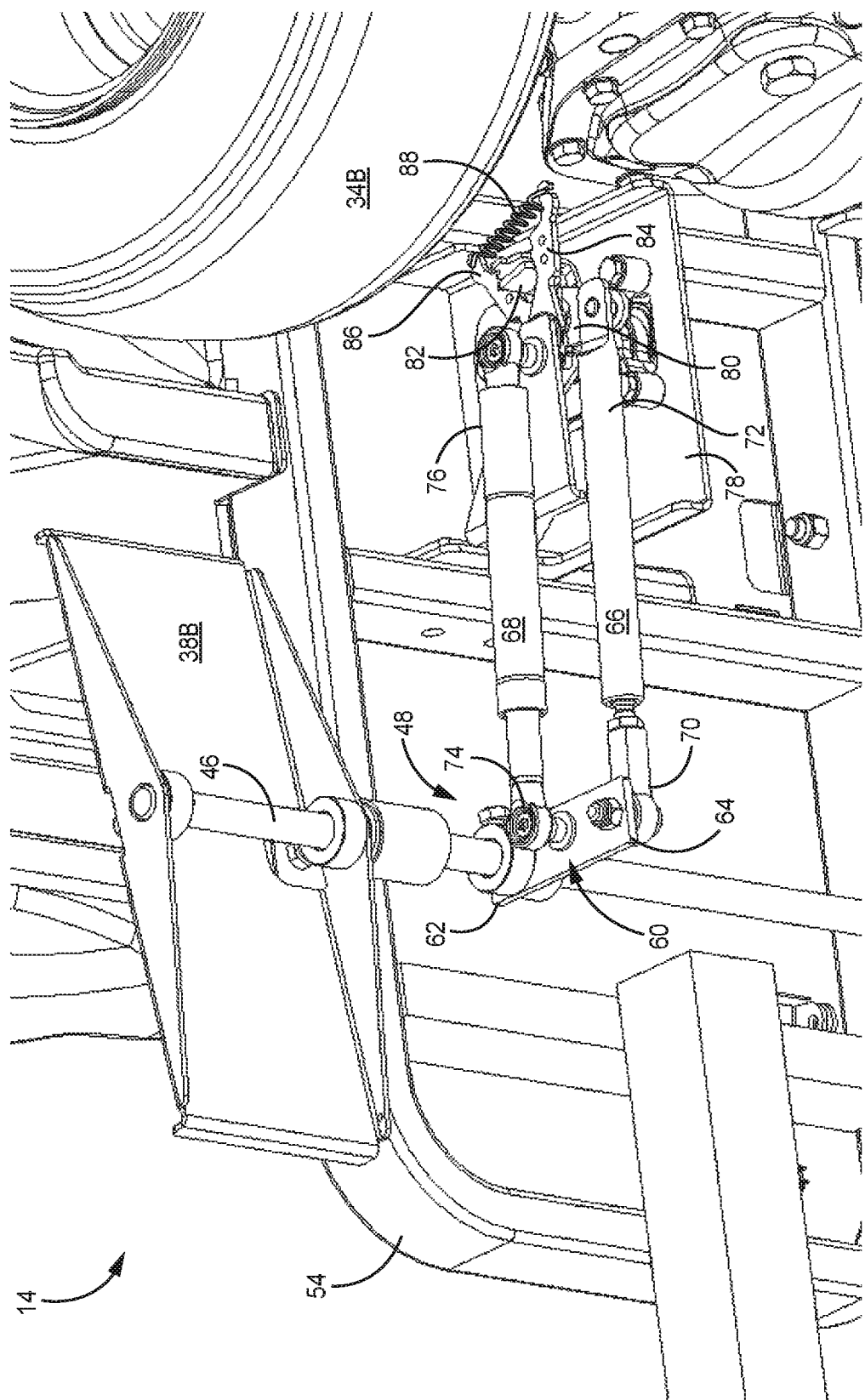
FIG. 6A is a perspective view of the driver showing a mechanical motion control.
Figure 6B:
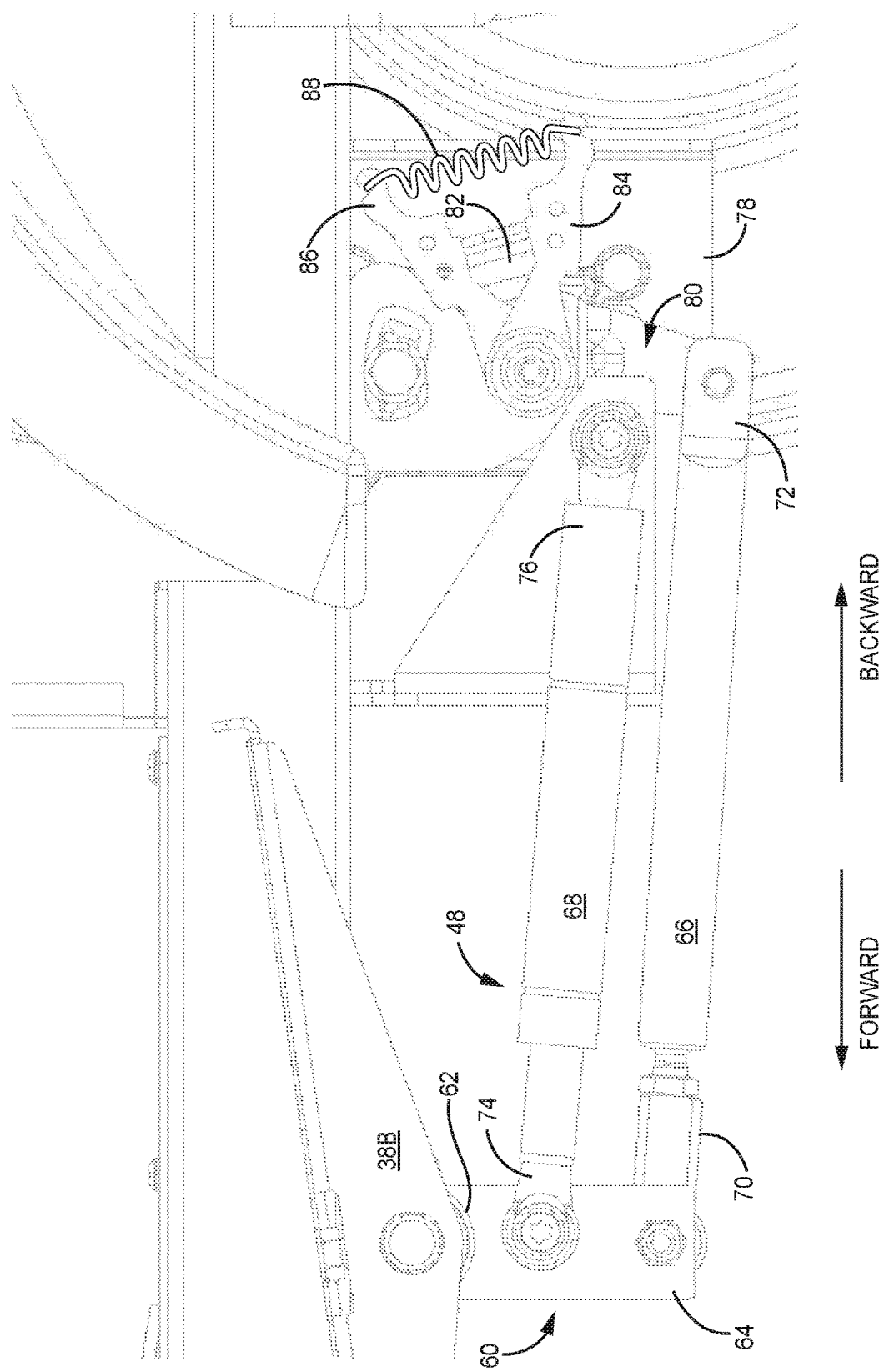
FIG. 6B is a side view of a portion of the driver showing the mechanical motion control.
Figure 6C:
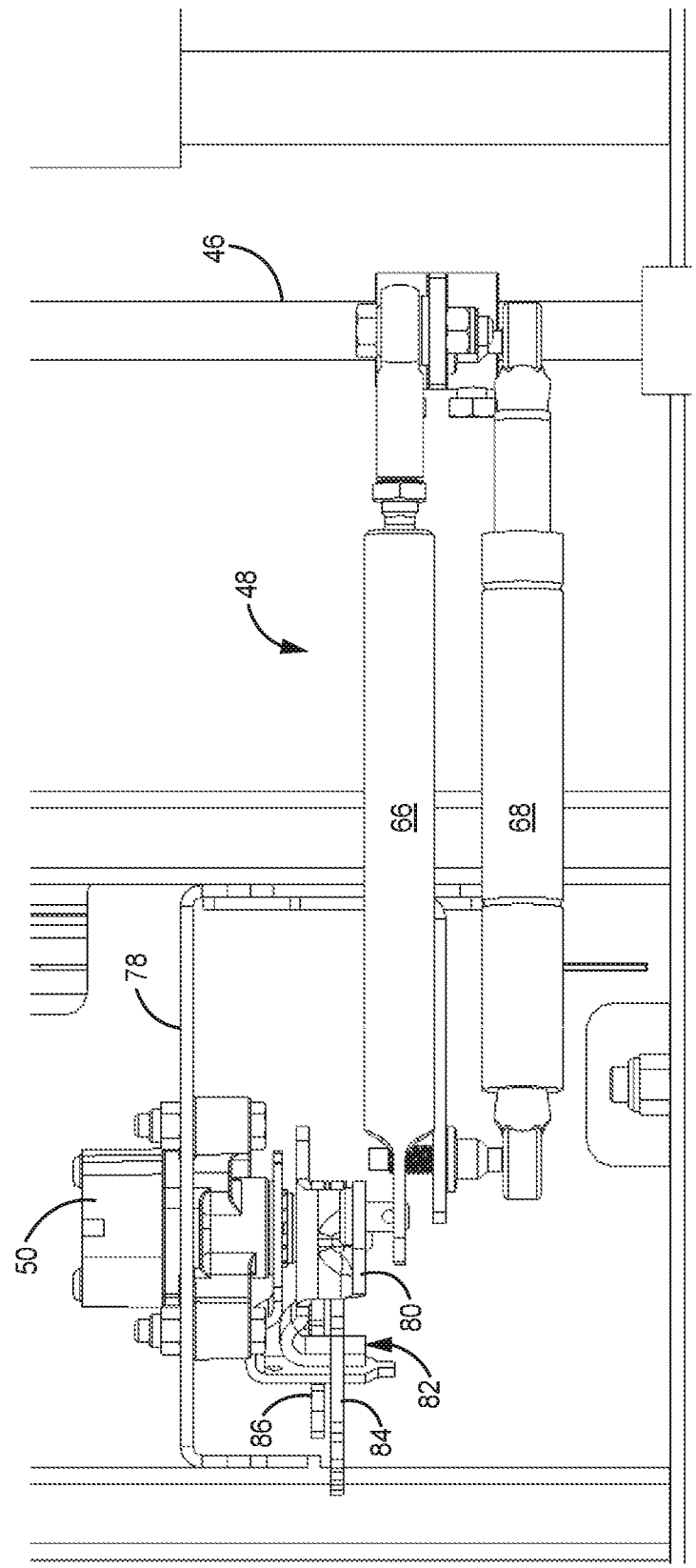
FIG. 6C is a plan view of a portion of the underside of the driver showing the mechanical motion control.

FIGS. 6A-6C illustrate various components of mechanical motion control 48. More specifically, FIG. 6A is a perspective view of the underside of driver 14. FIGS. 6B and 6C are detailed left side and bottom views, respectively, of mechanical motion control 48. With reference to FIGS. 6A-6C, mechanical motion control 48 includes pedal arm 60, pedal link 62, and pedal dampener 64. As shown, pedal arm 60 is arranged as a plate attached at its top end 62 to pedal axle 46 with, for example, a collar and set screw. A forward tilt of pedals 38A, 38B causes bottom end 64 of pedal arm 60 to move backward, while a rearward tilt causes bottom end 64 to move forward.

Pedal arm 60 is attached at its bottom end 64 to front ends 70 and 74, respectively, of pedal link 66 and pedal dampener 68. Pedal dampener 68 slows and smooths the motion of pedal plate 60, pedal axle 46, and pedals 38A, 38B in order to prevent the transmission of fast, jerking motions through these components. Such jerking motions may cause faster acceleration of driver 14 than intended by the operator. To that end, pedal dampener 68 can include an energy absorbing mechanism. In one embodiment, such a mechanism can be housing 67 with two fluidly connected chambers 69A, 69B of variable volume (shown schematically in FIG. 7) filled with fluid with a narrow constriction between them. The two chambers 69A, 69B can alternately empty and fill based on the stretching and compression of dampener 68.

Pedal dampener 68 is attached at its back end 76 to mounting plate 78, which is fixed to frame 54. In this regard, back end 76 of pedal dampener 68 is also fixed, while front end 74 is movable as pedal arm 60 is moved by the tilting of pedals 38A, 38B. For example, pedal dampener 68 can be stretched forward when the tilting of pedals 38A, 38B causes pedal arm 60 to move forward, and can be compressed when the tilting of pedals 38A, 38B causes pedal arm 60 to move backward. Pedal link 66 is attached at its back end 72 to plate 80. Plate 80 is pivotable with respect to mounting plate 78 by the forward and backward movement of pedal link 66 (via corresponding movement of bottom end 64 of pedal arm 60). Plate 80 includes tab 82. Tab 82 is positioned between first spring arm 84 and second spring arm 86, which are each connected to spring 88. Spring arms 84, 86 are pivotable with respect to mounting plate 78 through the movement of plate 80 and tab 82.

FIGS. 6A and 6B generally show tab 82 in a neutral position, as pedal 38B is also in a neutral position. Forward movement of pedal link 66 causes a corresponding movement of plate 80, which causes tab 82 to move downward from a neutral position to engage first spring arm 84. Conversely, backward movement of pedal link 66 causes tab 82 to move upward from a neutral position to engage second spring arm 86. Movement of either first or second spring arm 84, 86 stretches spring 88. Tab 82 only engages one spring arm at a time from its upward or downward movement, and the stretching of spring pushes tab 82 back toward a neutral position. This occurs because the spring resists stretching away from the stationary spring arm 84, 86, causing the moving spring arm 84, 86 to return to neutral. The return of tab 82 to a neutral position moves each of plate 80, pedal link 66, pedal arm 60, and pedal axle 46 to restore the neutral position of pedals 38A, 38B. Thus, spring 88 can serve to place pedals 38A, 38B in the neutral position when no opposing pressure is applied from the operator's foot.

FIG. 6C shows pedal tilt sensor 50 mounted to mounting plate 78. Pedal tilt sensor 50 measures the rotation of plate 80 (e.g., relative to the fixed position of pedal tilt sensor 50 and mounting plate 78). Pedal tilt sensor 50 can be any type of sensor suitable for measuring rotation or change of position. In the embodiment shown, pedal tilt sensor 50 is a potentiometer with a change in output based on rotation. In other embodiments, pedal tilt sensor 50 can be an encoder or hall effect sensor measuring changes in position (e.g., angular position) corresponding to rotation of plate 80.

Figure 7:
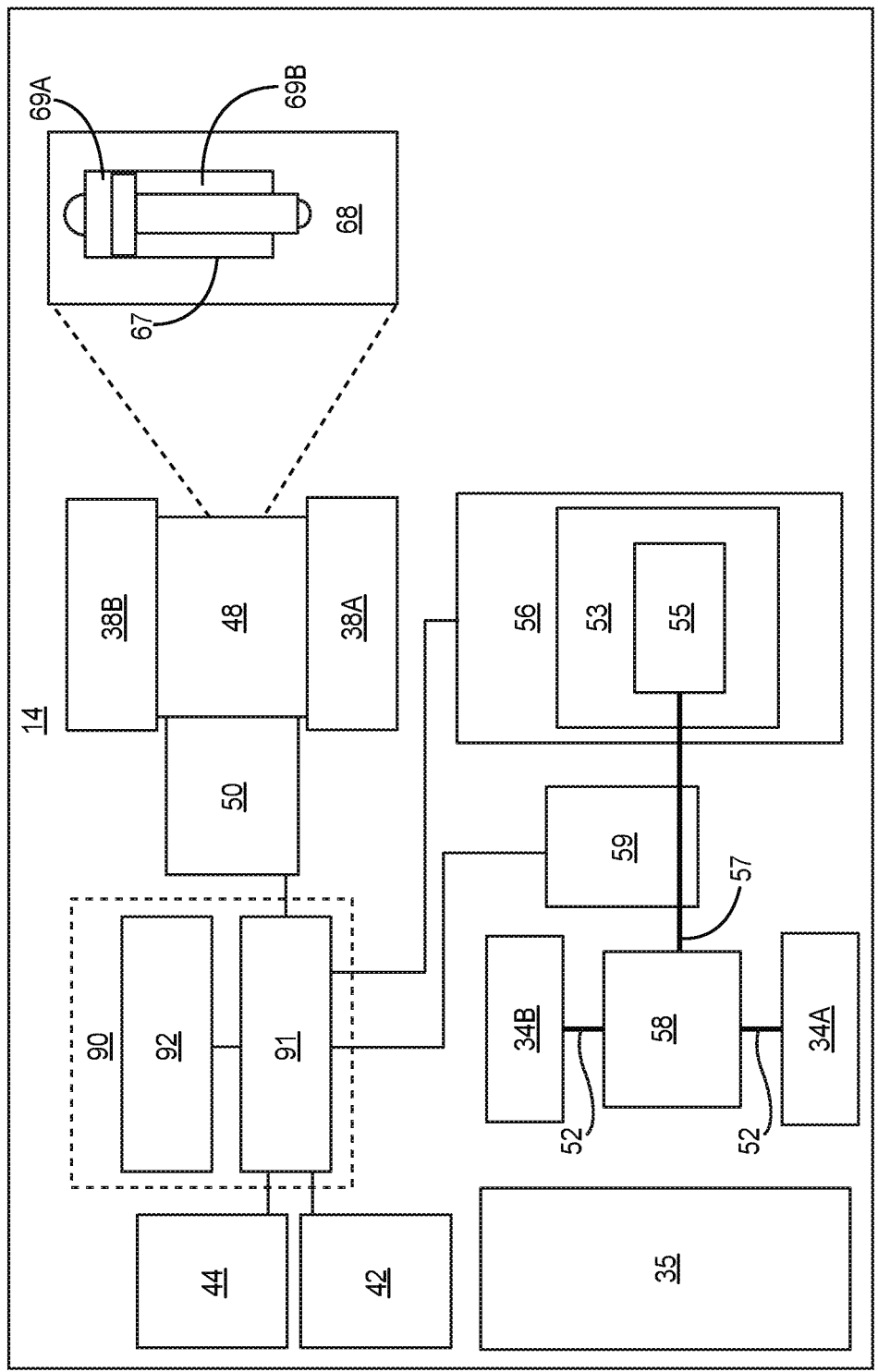
FIG. 7 is a schematic diagram showing various components of the driver.

FIG. 7 is a schematic diagram showing various components of driver 14. More specifically, FIG. 7 shows additional components of motor 56, drive shaft 57, speed sensor 59, and control circuitry 90. As shown, motor 56 includes stator 53 that at least partially surrounds rotor 55. Rotor 55 rotates driveshaft 57, which provides rotational motion to transaxle 58. Transaxle 58 rotates wheel axle 52 to rotate wheels 34A, 34B.

Speed sensor 59 can be one or more sensors for measuring a speed of driver 14. As represented, speed sensor 59 measures rotation of driveshaft 57, although in other embodiments, speed sensor 59 can be configured to measure other components to indicate speed. Speed sensor 59 can alternatively be integrated into transaxle 58 in other embodiments. Speed sensor 59 can be arranged as a pair of encoders for measuring rotation of driveshaft 57 or other rotating part associated with transaxle 58. In such an embodiment, the measured rotating component(s) can include evenly-spaced bars or markings optically sensed by speed sensor 59 to determine a rotational velocity corresponding to the rotational velocity of wheels 34A, 34B and thereby, the speed of driver 14. The use of dual encoders can allow for distinction of the direction of driver 14 (i.e., forward or backward). For example, the encoder markings can be out of sync, such that the first encoder can generate the first pulse (based on the detection of the first marking) before the second encoder. This condition can indicate forward motion of driver 14, whereas the second encoder generating the first pulse before the first encoder can indicate the backward motion. In other embodiments, speed sensor 59 can alternatively or additionally include one or more Hall effect sensors for indexing position of a cycle (e.g., rotation of driveshaft 57) for measuring the speed of driver 14.

FIG. 7 further illustrates speed control switch 42, speed control input 44, pedal tilt sensor 50, and speed sensor 59 in communication with control circuitry 90. Control circuitry can include logic circuitry for executing the functions discussed herein. Control circuitry 90 can include hardware, firmware, and/or stored software. Control circuitry 90 can be entirely or partially mounted on one or more boards. Control circuitry 90 can include one or more microprocessors or other type of chip. In the embodiment shown, control circuitry 90 includes processor 91 and memory 92. Memory 92 can store program instructions executable by processor 91 to carry out any of the functions referenced herein. Control circuitry 90 can output controlling signals to any of the electronic components of driver 14, such as motor 56. As an example, control circuitry 90 can increase or decrease driving power to motor 56 to accelerate or decelerate driver 14. It is noted that any driver 14 component may further include a separate microcontroller for managing its own operation.

Battery (or batteries) 35 can be used to directly or indirectly power any of control circuitry 90, control switch 42, speed control input 44, pedal tilt sensor 50, motor 56, and/or speed sensor 59. In some embodiments, driver 14 does not include a liquid fuel and/or combustion engine, and battery 35 is the only power source on driver 14. In some embodiments, battery 35 can be plugged into a conventional electrical socket via a power cord (not shown) for recharging.

Figure 8:
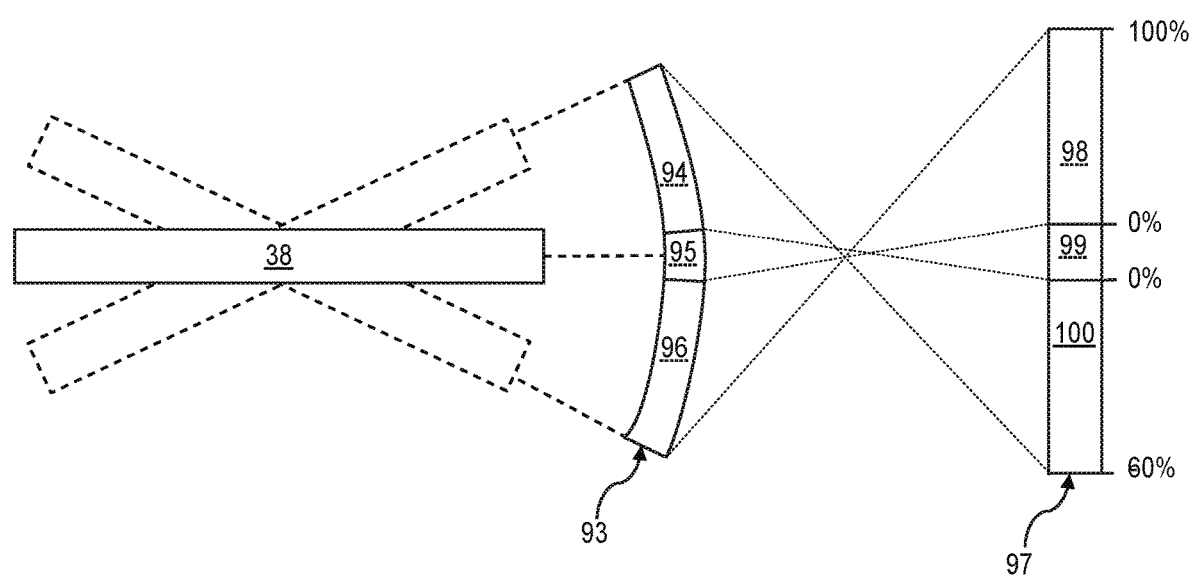
FIG. 8 is a schematic diagram showing various tilt states of a pedal belonging to the driver, as well as corresponding speed ranges.
Figure 10:
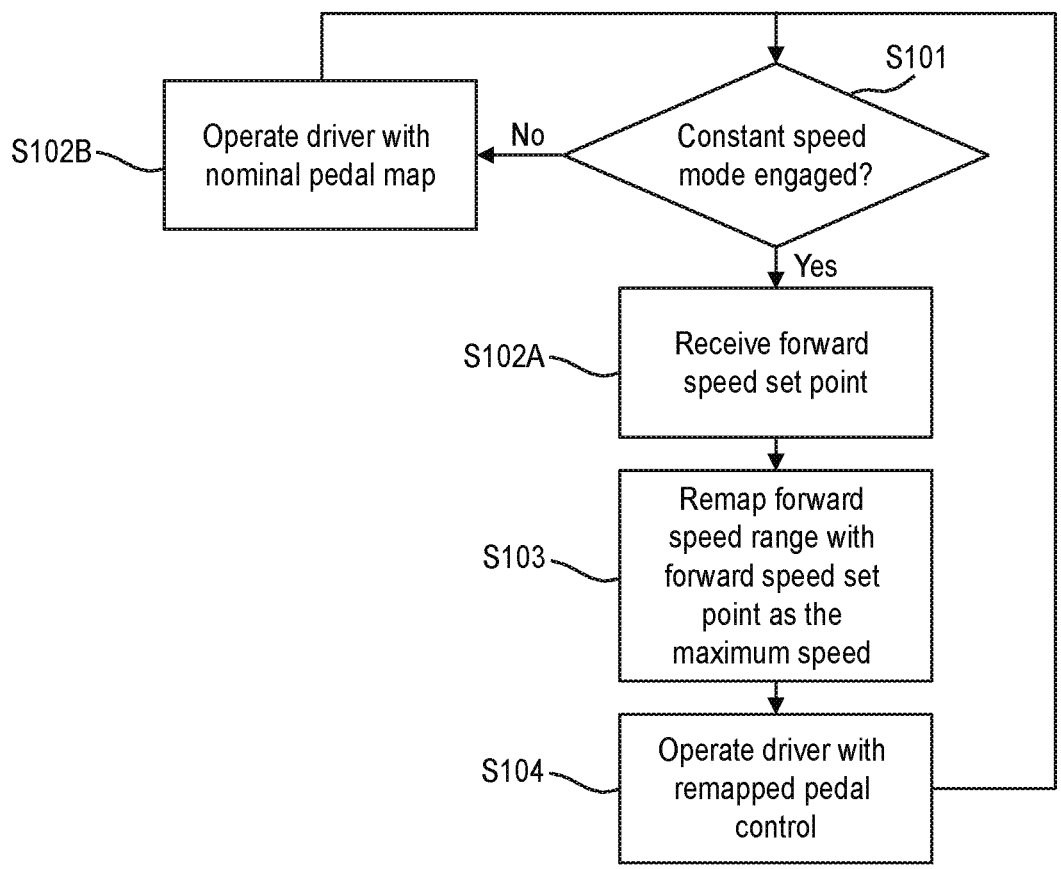
FIG. 10 is a flowchart illustrating the steps for engaging the driver's speed control feature.

FIG. 8 is a schematic diagram illustrating how pedal tilt is used to control operation of driver 14. Only a single pedal 38 is shown in FIG. 10 for simplicity, although as previously described, dual linked pedals 38A, 38B can be used.

Pedal 38 is shown having three states: no-tilt, forward tilt, and rearward tilt. In the no-tilt state, pedal 38 can be in a generally horizontal position which is also the neutral/nominal position described above into which pedal 38 can be placed by the components of mechanical motion control 48 when no stepping force is applied to pedal 38 by the operator. Respective maximum forward and rearward tilt states are also indicated with dashed lines. Pedal 38 can tilt to various degrees between the three states. The degree of tilting or non-tilting of pedal 38 can be understood as the angle of the generally horizontal profile of pedal 38 with respect to the no-tilt (neutral) state.

Each tilt state includes an angular range illustrated by tilt range chart 93. More specifically, tilt range chart 93 includes forward tilt range 96, neutral tilt range 95, and rearward tilt range 94. The ranges of chart 93 correspond continuously with the respective tilt state of pedal 38. A perfectly horizontal position of pedal 38 is not necessarily required to achieve the neutral/no-tilt state. As a result, neutral range 95 can be anywhere from 5, 10, or 20 degrees forward or backward from a horizontal (0 degree) position depending on the particular embodiment. This can be beneficial, for example, to allow operators of various sizes and/or with various biomechanics to select a suitable neutral position, and/or to provide a larger range to keep the operator from inadvertently entering either the forward or rearward tilt position.

Forward tilt range 96 and rearward tilt range 94 can each correspond to a wider band than neutral tilt range 95. This allows for greater angular variation corresponding to different speeds. Rearward tilt range 94 can have the same angular distance as forward tilt range 96, but in some embodiments, may correspond to a smaller range of speed, as is discussed in greater detail below.

Pedal tilt sensor 50 operates to provide continuous variation in each of forward tilt range 96 and rearward tilt range 94. Where pedal tilt sensor 50 is a potentiometer, one or more electrical signals can be sent through an annular conductor having a resistance property. Rotation of pedal 38 can correspondingly move a wiper along the annular conductor to shorten or lengthen the distance along the annular conductor that the electrical signal must travel. The greater the travel distance along the annular conductor, the greater the voltage drop measured between the wiper and the input of the annular conductor. For example, the maximum of rearward tilt range 94 can correspond with a 1.0 V output signal, and the minimum of rearward tilt range 94 (corresponding to the maximum rearward tilt of neutral range 95) can correspond with a 4.5 V output signal. The minimum of forward tilt range 96 (corresponding to the maximum forward tilt of neutral range 95) can correspond with a 5.5 V output signal, and the maximum of forward tilt range 96 can correspond with a 9.0 V output signal. As such, the output signals from pedal tilt sensor 50 can indicate the direction of tilt, forward or rearward, of pedal 38. The output signals can further indicate the degree of tilt continuously through each of rearward tilt range 94, neutral tilt range 95, and the forward tilt range 96.

Tilt ranges 94, 95, 96 of pedal 38 correspond to speed ranges 100, 99, 98, respectively, as illustrated by speed range chart 97. The speed ranges can be adjusted based on speed targets (i.e., particular operating speeds corresponding to different degrees of tilt of pedal 38) as selected by the operator. In some operations of driver 14, increasing forward tilt of pedal 38 through forward tilt range 96 can proportionally increase the forward speed through forward speed range 98. Decreasing forward tilt through forward tilt range 96 can proportionally decrease the forward speed through forward speed range 98. Increasing rearward tilt through rearward tilt range 94 can proportionally increase the reverse speed through rearward speed range 100. Decreasing rearward tilt through rearward tilt range 94 can proportionally decrease the reverse speed through rearward speed range 100.

As shown in FIG. 8, the maximum extent of forward tilt range 96 can correspond with a 100% output of motor 56 (e.g., motor 56 is driven at its maximum setting in a rotational direction corresponding to forward motion of driver 14). A tilt position corresponding to the middle of forward tilt range would correspondingly result in a 50% output of motor 56. Alternatively, pedal 38 tilt can be mapped to a selected speed target of driver 14. For example, the maximum extent of forward tilt range 96 can correspond to a speed target of 10 miles (~16 kilometers) per hour in a forward direction, while a middle tilt position (50% output) can correspond to a speed target of 5 miles (~8 kilometers) per hour. All of neutral range 99 can correspond to a 0% output of motor 56 or a stationary (0 miles/kilometers per hour) speed target with no forward or rearward movement of driver 14. The maximum extent of rearward tilt range 94 can correspond with a −60% output of motor 56 (i.e., motor 56 is driven at 60% its maximum setting in a rotational direction corresponding to the rearward direction of driver 14). If using a speed target instead, −60% output of motor 56 corresponds to a reverse speed of 6 miles (~9.6 kilometers) per hour.

It is noted that a greater maximum speed is allowed for the forward direction of driver 14 than the rearward (reverse) direction. As discussed above, forward speed range 98 can be 0 to 10 miles (0 to ~16 kilometers) per hour, while rearward speed range 100 can be 0 to 6 miles (0 to ~9.6 kilometers) per hour. Even so, forward tilt range 96 and rearward tilt range 94 can have equivalent angular distances, such that pedal 38 rotates the same angular distance when traveling through forward tilt range 96 as it does when travelling through rearward tilt range 94. In other embodiments, rearward tilt range 94 can have a smaller angular distance than forward tilt range 96. For example, if rearward speed range 100 reaches a maximum (output or speed) that is 60% of the maximum of forward speed range 98, then rearward tilt range 94 can accordingly be adjusted to be 60% of the angular distance of forward tilt range 96.

Figure 9:
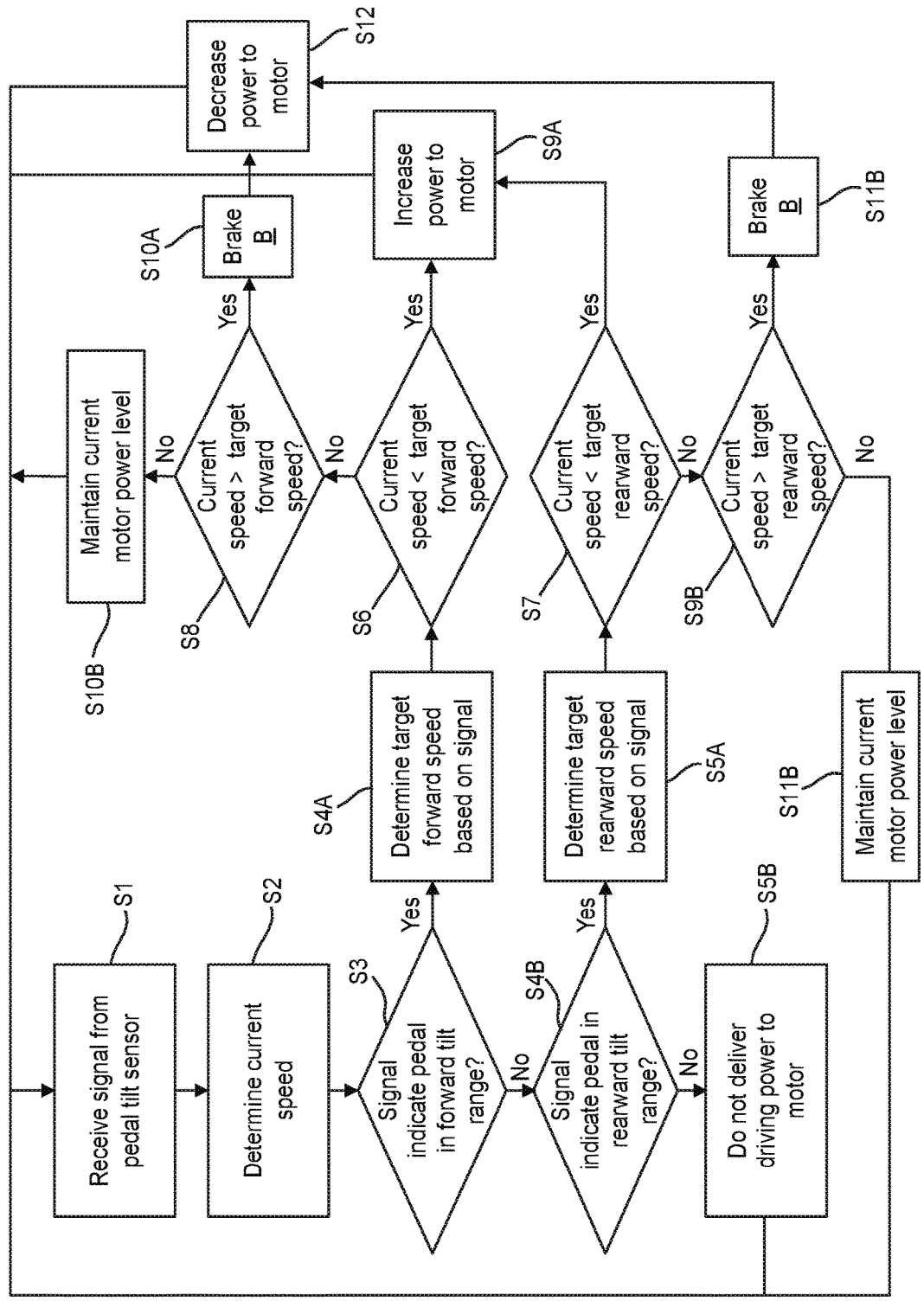
FIG. 9 is a flowchart illustrating the steps for controlling the output of the driver's motor.

FIG. 9 is a flowchart illustrating the process of controlling output of motor 56 based on sensor inputs. More specifically, FIG. 9 represents an algorithm used to achieve and maintain a targeted speed or motor output. At step S1, a signal is received from pedal tilt sensor 50. In the embodiment shown, processor 91 of control circuitry 90 can receive the signal. At step S2, a current speed of driver 14 is determined. This can include receiving a signal from speed sensor 59 to determine the current speed of driver 14. A multiplier coefficient can be used to proportionally relate the speed of driver 14 with the rotational speed of driveshaft 57 (or other rotating component) as determined by speed sensor 59.

At step S3, it is determined whether the signal received from pedal tilt sensor 50 indicated that pedal 38 is in forward tilt range 96. If it is determined that pedal 38 is not in forward tilt range, then step S4B determines whether pedal 38 is in rearward tilt range 94. If pedal 38 is not in rearward tilt range 94, then it can be concluded that pedal 38 is in neutral range 95, indicating that the operator is not electing to propel driver 14. As a result, at step S5B, driving power is stopped or otherwise not delivered to motor 56.

Returning to step S3, if it is determined that pedal 38 is in forward tilt range 96, the process advances to step S4A to determine the target forward speed based on the signal received from pedal tilt sensor 50. This can include translating the angle, signal voltage, or other indicator of tilt degree to forward speed range 98 of speed range chart 97. Determining target forward speed can further include using an algorithm or lookup table to determine a target forward speed based on the degree of tilt of pedal 38, wherein such algorithm or lookup table outputs higher forward target speed for greater forward tilt, and lesser forward target speed for lesser forward tilt, for continuous ranges of pedal 38 tilt and target speeds.

After step S4A, the process advances to step S6 to determine whether the current speed (determined at step S2) is less than the target forward speed determined at step S4A. If the current speed is less than the target forward speed, the process advances to step S9A to increase driving power to motor 56. Increasing the driving power can correspond to increasing the power beyond the current amount of driving power delivery. Step S9A can include engaging in an acceleration profile to gradually increase driving power over the course of one, two, three, or four or more seconds to avoid aggressive acceleration. If the check in step S6 determines that the current speed is not less than the target forward speed, then the process advances to step S8. At step S8, a comparison is performed to determine whether the current speed (as determined at step S2) is greater than the target forward speed. If the current speed is not greater than the target forward speed, then the process ultimately advances to step S1 or other step restarting the iteration, and motor 56 driving power is not increased or decreased.

If, at step S8, the current speed is greater than the target forward speed, then the process advances to step S10A in which a brake (B) is applied. Brake B is intended to slow driver 14 toward the current targeted forward speed. In some cases, Brake B can represent a regenerative braking method such as allowing rotor 55 to free spin in stator 53. This generates electrical energy which can be routed to battery 35 for recharging. In some cases, brake B can represent an active braking method. For example, physically moving motor 56 components to realign the phases of stator 53 and rotor 55 can alter motor performance and have a braking effect. Alternatively, a solenoid could also be used to engage/disengage a braking feature of motor 56 forcing cogs to engage and alter motor rotation. In other embodiments, Brake B can involve a mechanical braking method that frictionally engages drive shaft 57, a component of transaxle 58, wheel axle 52, and/or one or both of wheels 34A, 34B.

Returning to step S4B, if the check determines that pedal 38 is in rearward tilt range 94, the process advances to step S5A to determine the target reverse speed based on the signal received from pedal tilt sensor 50. Determining the target reverse speed can include translating the angle, signal voltage, or other indicator of tilt degree to rearward speed range 100 of speed range chart 97. Determining target reverse speed can further include using an algorithm or lookup table to determine a target reverse speed based on the degree of tilt of pedal 38, wherein such algorithm or lookup table outputs higher rearward target speed for greater rearward tilt, and lesser rearward target speed for lesser rearward tilt, for continuous ranges of pedal 38 tilt and target speeds.

The process advances to step S7 to determine whether the current speed (determined at step S2) is less than the target rearward speed determined at step S5A. If the current speed is not less than the target rearward speed, then the process advances to step S9B. At step S9B, it is determined whether the current speed is greater than the target rearward speed. If the current speed is not greater than the target rearward speed, then it is assumed that the current speed matches the target rearward speed, and the process advances to step S11B to maintain the current power output the motor 56. After step S11B, the process returns to step S1 (or another step) for another iteration of the loop.

If, at step S9B, the check determines the current speed is greater than the target rearward speed, then the process advances to step S11A to brake. Braking in step S11A can be the same as the braking of step S10A, except that in step S11A, the goal is to decelerate rearward instead of decelerating forward movement.

The process advances to step S12 from either step S10A or step S11B. At step S12, driving power to motor 56 is reduced. After step S12, the process returns to step S1 (or another step) for another iteration of the loop. Is noted that the order of steps S11A and step S12 can be reversed and/or the steps can be performed in several alternating phases of braking and motor 56 driving power decreasing in various other embodiments.

Returning to step S7, if the check determines that the current speed is less than the target rearward speed, the process advances to step S9A at which driving power to motor 56 is increased.

It should be understood that the embodiment shown in FIG. 9 is one version of demonstrating various steps, and that one or more can be eliminated, substituted, added, or otherwise changed or integrated into other processes. For example, one or both braking steps S10A, S11A can be omitted and driver 14 instead allowed to coast to slow down.

FIG. 10 is a flow chart illustrating a process for engaging a speed control feature of driver 14. For most operations of ground surface modifying system 10, maintaining a constant speed of the ground surface modifying machine 12 can be important. For example, when line striping, it is important to have each stripe/line painted to the same thickness, otherwise the stripes will have different colors and appearances, and/or will wear at different rates. In some cases, absolute speed is more important than the drive power of motor 56 because changing conditions, such as a hill, can change the speed of driver 14 despite consistent drive power to motor 56. Therefore, closed loop speed control is desired. Assuming that pump system 22 outputs consistent volume of paint from dispenser 24, a constant speed should form stripes of even thickness. Because a project might require that several hundred stripes be dispensed over the course of several hours, it can be difficult for the operator to find and maintain a particular forward speed for each stripe, considering that pedal 38 is often tilted back-and-forth multiple times to precisely align dispenser 24 for each stripe. Thus, FIG. 10 demonstrates a speed control feature to help driver 14 repeatedly reach and maintain a consistent speed despite intervening forward-backward maneuvering of the ground surface modifying system 10 between each stripe.

The process of FIG. 10 includes operating driver 14 within a nominal foot pedal map. The nominal foot pedal map can be a standard (e.g., full range, linear) correspondence between pedal 38 tilt and targeted speed of motor 56, such as that demonstrated in FIG. 8. The process includes a check in step S101 which determines whether a constant speed mode has been engaged. The constant speed mode can be engaged when speed control switch 42 is actuated to an ON state. If speed control switch 42 is not actuated to the ON state, then the process advances to step S102B to operate driver 14 within the nominal foot pedal map. If, instead, speed control switch 42 is actuated to the ON state, then the process advances to step S102A. At step S102A, control circuitry 90 receives a forward speed set point. The forward speed set point can be received from speed control input 44. Speed control input 44 can be a knob linked with a potentiometer, a digital input, or other type of input for indicating a forward speed set point. The forward speed set point can serve as a temporary maximum forward speed as further shown.

The forward speed set point can be less than the maximum forward speed that driver 14 is capable of achieving in the nominal foot pedal map, and can be less than the 100% speed indicated in FIG. 10. For example, speed control input 44 can be a potentiometer able to indicate a range of speeds. As opposed to pedal 38 being the speed input, speed control input 44 can be set at a particular level (e.g., the forward speed set point) despite forward and reverse commands and corresponding actions as input through pedal 38. Therefore, pedal 38 can be used to move driver 14 forward and rearward during maneuvering when not spraying a ground stripe, but the forward speed set point can be used whenever spraying a ground stripe so that spraying can be carried out at a consistent speed for every stripe painted.

To indicate a forward speed set point, the operator can, while seated on driver 14, set speed control input 44 to its lowest setting, corresponding to a low or zero speed. The operator can then engage speed control switch 42 to activate the speed control function. Once the speed control function is on, control circuitry 90 drives motor 56 at the set speed as long as pedal 38 is tilted to or past some degree of forward tilt range 94. The operator can then tilt pedal 38 forward within forward tilt range 94, such as to its maximum forward tilt. In this state, driver 14 will not be propelled forward, or will be propelled at a very low speed, because speed control input 44 was set to the lowest speed, which may be zero. The operator can then slowly increase the level of speed control input 44, corresponding to an increasing forward speed set point, during which time control circuitry 90 recognizes that the target speed is greater than the current speed, and will cause motor 56 to accelerate driver 14 forward. The operator can continue to increase the level of the forward speed set point using speed control input 44 until driver 14 is moving at a desired speed. When the desired speed is reached, the operator can stop manipulating speed control input 44 (i.e., leave speed control input 44 at the setting that achieved the desired speed). Driver 14 can subsequently achieve and maintain the speed corresponding to the forward speed set point if a particular input is received from pedal tilt sensor 50 indicating that pedal 38 has been pushed to or past the forward speed set point along forward tilt range 94, as further discussed herein.

Once the forward speed set point is set, the process advances to step S103. At step S103, control circuitry 90 remaps the forward tilt profile of pedal 38 with the current forward speed set point of speed control input 44 serving as the maximum forward speed allowed by actuation of pedal 38 while the constant speed mode is engaged (or until speed control input 44 indicates a different forward speed set point level). The process then advances to step S104 which operates driver 14 with the remapped pedal control. The remapping of the pedal control is illustrated in FIGS. 11 and 12.

Figure 11:
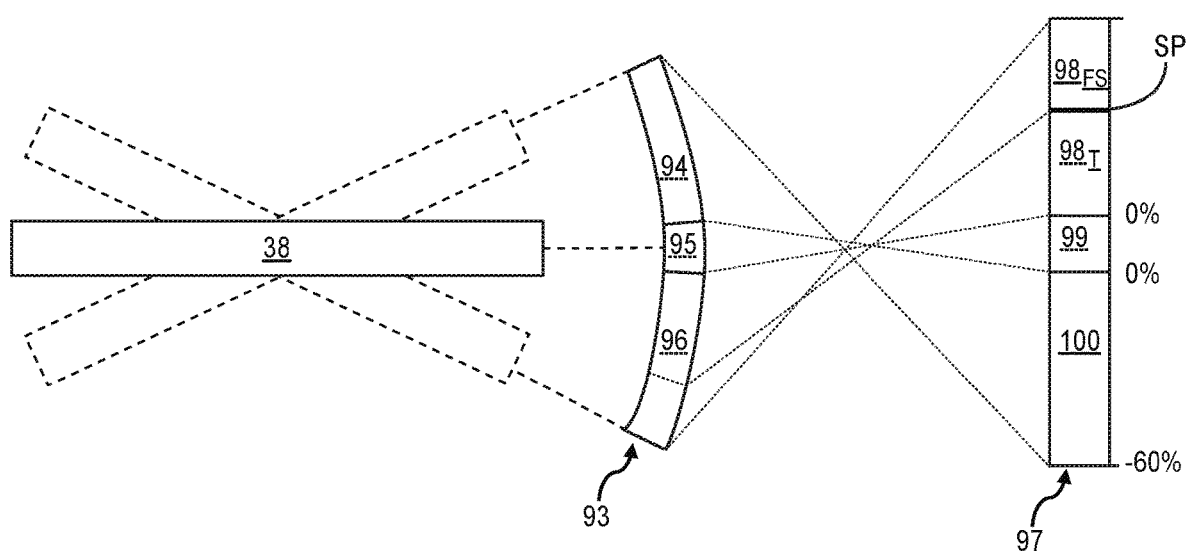
FIG. 11 is a schematic diagram showing a remapped state of the pedal control.
Figure 12:
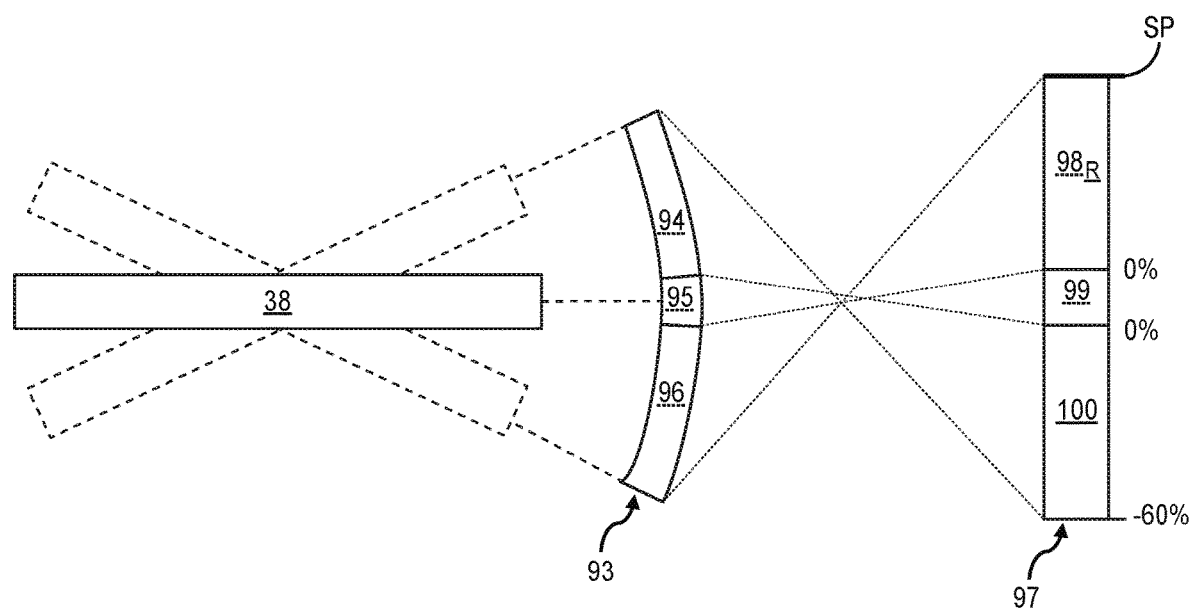
FIG. 12 is a schematic diagram showing an alternative remapped state of the pedal control.

FIG. 11 is similar to FIG. 8, but schematically illustrates the remapping of forward speed range 98 based on forward speed set point SP, as previously described. In FIG. 11, forward speed set point SP corresponds with a lesser speed than what would other have been the maximum speed of the forward speed range (e.g., under the nominal foot pedal map). This splits forward speed range 98 into truncated forward speed range $98_T$ and a forward speed set point range $98_{FS}$. Truncated forward speed range $98_T$ is the same as the corresponding lower speed portion of the original forward speed range 98 and has continuous speed control, such that increasing forward tilt of pedal 38 through truncated forward speed range $98_T$ corresponds with increasing target speed to the same amount as the nominal foot pedal map. For example, truncated forward speed range $98_T$ can span from 0 miles per hour to 7 miles (~11.3 kilometers) per hour. Other forward speed set points are contemplated herein. As another example, truncated forward speed range $98_T$ can span 0% to 70% of maximum engine output.

Forward speed set point range $98_{FS}$ represents a range that has the same target speed throughout, specifically the forward speed set point. As pedal 38 is tilted forward into and through forward speed set point range $98_{FS}$, the target speed does not change and continues to be the speed of the current forward speed set point. In this regard, setting the forward speed set point SP creates a forward speed set point range $98_{FS}$ of forward tilt that the operator can move pedal 38 into and through without deviating from the speed of the forward speed set point. The advantage of having forward speed set point range $98_{FS}$ correspond with a single forward speed is that the operator does not need to finesse the particular angle of pedal 38 to achieve the targeted speed of the forward speed set point when applying stripe after stripe. Rather, the operator can just move pedal 38 anywhere into forward speed set point range $98_{FS}$ and achieve the same speed. For example, after using truncated forward speed range $98_T$ and/or rearward speed range 100 to precisely align dispenser 24 with the trajectory of the next stripe, the operator can simply push (or otherwise move) pedal 38 to its maximum forward tilt to achieve targeted speed of the forward speed set point for spraying a consistent stripe, over and over, as necessary. Without implementing forward speed set point range $98_{FS}$, such "jamming" of pedal 38 would command driver 14 to move at its fastest possible speed, which may not be desirable for certain striping operations.

It is noted that when pedal 38 tilts to its maximum extent in forward speed set point range $98_{FS}$ and speed control switch 42 is engaged, the speed of driver 14 is determined by the forward speed set point SP which can be dynamically adjusted by speed control input 44. In this way, the operator can adjust the forward speed set point to a desired setting.

FIG. 12 demonstrates another option for remapping the pedal control. The operation of the system shown in FIG. 12 is similar to that of FIGS. 8 and 11, except as otherwise noted. In this version, the forward speed set point SP is always at the maximum degree of forward tilt of pedal 38, with the rest of forward speed range $98_R$ being scaled to go from zero at its lowest end up to the level of the forward speed set point SP. In this regard, the full range of forward tilt through forward speed range $98_R$ is still available to the operator for continuous speed adjustment while maneuvering, but is rescaled through the range being that the maximum speed is now lower. For example, if the forward speed set point SP is 7 miles (~11.3 kilometers) per hour or 70% output, then the full travel of remapped forward speed range $98_R$ will be 0 miles per hour to 7 miles per hour, or 0% to 70% output (instead of 0-10 miles per hour or 0-100% ranges without the speed control feature engaged or in the nominal pedal map). In this example, moving pedal 38 from neutral through the entire remapped forward speed range $98_R$ will continuously increase the target speed from 0 to 7 miles per hour until pedal 38 reaches the maximum forward tilt position, at which point the speed will remain at 7 miles per hour.

It is noted that in each of the examples of FIGS. 11 and 12, neutral speed range 99 and rearward speed range 100 are not truncated or otherwise remapped. It is further noted that the various speed control features discussed above allow the operator to achieve a continuous speed of driver 14 when pedal 38 is tilted to or past a threshold degree within a set range. In this regard, the operator must maintain the threshold degree of tilt to maintain continuous speed. This differs from other equipment/vehicles which may allow an operator to achieve a speed set point, then remove physical contact (e.g., hands or feet) from the controls.

Discussion of Possible Embodiments

The following are non-exclusive descriptions of possible embodiments of the present invention.

A battery powered driver for propelling a wheeled ground surface modifying machine includes at least one wheel contacting a ground surface, a battery powered electric motor, control circuitry configured to manage delivery of electrical battery power to the electric motor to control a sped of the driver, at least one pedal attached to a pedal axle and tiltable in each of a forward and rearward direction with respect to the pedal axle, and at least one pedal tilt sensor configured to output one or more signals to the control circuitry indicating a degree of tilt of the at least one pedal. The control circuitry is configured to control the electric motor to accelerate the driver forward based on the one or more signals indicating a forward tilt of the at least one pedal, the electrical battery power delivered to the electric motor for forward acceleration proportional to a degree of forward tilt of the at least one pedal, and to control the electric motor to accelerate the driver rearward based on the one or more signals indicating a rearward tilt of at least one pedal, the electrical battery power delivered to the electric motor for rearward acceleration proportional to a degree of rearward tilt of the at least one pedal.

The driver of the preceding paragraph can optionally include, additionally and/or alternatively, any one or more of the following features, configurations and/or additional components:

In the above driver, the at least one pedal can include a first pedal and a second pedal, the first and second pedals being disposed on opposing lateral sides of the driver.

In any of the above drivers, the first and second pedals can be mechanically linked to one another via the pedal axle such that the first and second pedals tilt together.

In any of the above drivers, the at least one pedal tilt sensor can include a potentiometer that outputs the one or more signals based on the direction and degree of tilt of the at least one pedal.

In any of the above drivers, the at least one pedal can have a neutral position in which the at least one pedal is within a range of tilt from horizontal in the forward and rearward directions with respect to the ground surface, and the control circuitry can be configured to not deliver driving power to the electric motor for accelerating the driver forward or rearward when the at least one pedal is in the neutral position.

In any of the above drivers, the range can include 5 degrees of forward or rearward tilt of the pedal from horizontal.

Any of the above drivers can further include a speed sensor configured to output a speed signal indicative of a current measured speed of the driver.

In any of the above drivers, the control circuitry can be configured to determine a target forward speed based on an amount of forward tilt of the at least one pedal as indicated by the one or more signals, increase delivery of driving power to the electric motor if the target forward speed is greater than the current speed of the driver as indicated by the speed signal, and decrease delivery of driving power to the electric motor if the target forward speed is less than the current speed of the driver as indicated by the speed signal.

In any of the above drivers, the control circuitry can further be configured to determine a target reverse speed based on an amount of rearward tilt of the at least one pedal as indicated by the one or more signals, increase delivery of driving power to the electric motor if the target reverse speed is greater than the current speed of the driver as indicated by the speed signal, and decrease delivery of driving power to the electric motor if the target reverse speed is less than the current speed of the driver as indicated by the speed signal.

Any of the above drivers can further include a speed control input configured to output a set point signal to the control circuitry, the set point signal indicating a forward speed set point. The forward speed set point can be a non-zero value and less than a maximum forward speed at which the control circuitry will cause the driver to be accelerated to by the electric motor based on a maximum forward tilt position of the at least one pedal.

In any of the above drivers, the control circuitry can be configured to remap a forward speed range based on the forward speed set point, the forward speed range corresponding to a range of forward speeds that can be indicated based on a proportional forward tilt of the at least one pedal.

In any of the above drivers, the control circuitry can be configured to remap the forward speed range by setting the current target forward speed to the forward speed set point based on the at least one pedal being tilted past a threshold angle associated with the forward speed set point.

In any of the above drivers, the control circuitry can be configured to remap the forward speed range by substituting a truncated forward speed range and a forward speed set point range for the forward speed range when determining the target forward speed, the forward speed set point range corresponding to greater forward tilt of the at least one pedal as compared to the truncated forward speed range.

In any of the above drivers, the control circuitry can further be configured to proportionally increase the target forward speed as the at least one pedal further tilts through the truncated forward speed range, and maintain the target forward speed at a level corresponding to the forward speed set point despite forward or rearward tilting of the at least one pedal within the forward speed set point range.

In any of the above drivers, the control circuitry can be configured to remap the forward speed range by setting a speed associated with the forward speed set point as the maximum forward speed of the forward speed range and rescaling the rest of the forward speed range based on the speed associated with the forward speed set point.

In any of the above drivers, the at least one wheel can include a first wheel and a second wheel, and the first and second wheels can be the only wheels of the driver that contact the ground surface during operation of the driver.

In any of the above drivers, the driver can be without a steering mechanism.

Any of the above drivers can further include a hitch for connecting the driver to the ground surface modifying machine, the driver configured to push the ground surface modifying machine forward, and pull the ground surface modifying machine rearward, via the hitch.

Any of the above drivers can further include a motion control mechanism linked to the at least one pedal. The motion control mechanism can include a dampener mechanically linked to the pedal axle, a linking rod mechanically linked to the pedal axle, and a spring mechanically linked to the linking rod.

In any of the above drivers, the dampener can include a housing with at least one chamber, and a fluid within the housing.

A battery powered driver for propelling a wheeled ground surface modifying machine includes at least one wheel contacting a ground surface, a battery powered electric motor, at least one pedal actuatable through a range, at least one pedal sensor configured to output one or more signals indicating a degree of actuation of the at least one pedal within the range, a speed control input for inputting a constant speed level, and control circuitry configured to receive the one or more signals and the constant speed level, and manage delivery of electrical battery power to the electric motor to control a speed of the driver. The control circuitry is further configured to control the electric motor to accelerate the driver forward based on the one or more signals indicating actuation of the at least one pedal within a first portion of the range, the power delivered to the electric motor for forward acceleration proportional to the degree of actuation of the at least one pedal through the first portion of the range such that the speed of the driver is variable based on the degree of actuation of the pedal within the first portion of the range, and to control the electric motor to accelerate the driver forward to the constant speed level based on the one or more signals indicating actuation of the pedal to a second portion of the range, the second portion being distinct from the first portion of the range, and the second portion corresponding with further actuation of the at least one pedal with respect to the first portion of the range.

The driver of the preceding paragraph can optionally include, additionally and/or alternatively, any one or more of the following features, configurations and/or additional components:

In the above driver, the constant speed level can be an operator input indicating a predetermined constant speed, and the control circuitry can be configured to receive the operator input indicating the predetermined constant speed.

In any of the above drivers, the control circuitry can be configured to receive the predetermined constant speed from a speed sensor measuring the speed of the driver when the speed control input is actuated.

In any of the above drivers, the control circuitry can be configured to receive the operator input indicating the predetermined constant speed from the at least one pedal sensor indicating the degree of actuation of the at least one pedal within the range.

In any of the above drivers, the second portion of the range can be the maximum extent of actuation of the at least one pedal.

In any of the above drivers, the control circuitry can be configured to operate in a first mode in which the power delivered to the electric motor for forward acceleration is proportional to the degree of actuation of the at least one pedal through the first portion of the range and the second portion of the range such that the speed of the driver is variable based on the degree of actuation of the at least one pedal through the first portion of the range and the second portion of the range, and in a second mode in which the power delivered to the electric motor for forward acceleration is proportional to the degree of actuation of the at least one pedal through the first portion of the range, but not the second portion of the range, such that the speed of the driver is variable based on the degree of actuation of the at least one pedal within the first portion of the range while the control circuitry causes the operator to maintain the predetermined constant speed when the at least one pedal is actuated to within the second portion of the range.

In any of the above drivers, the first portion of the range can represent the same range of variable speeds in the first mode and the second mode.

In any of the above drivers, when transitioning to the second mode, the control circuitry can remap the first portion of the range to represent a different range of variable speeds as compared to the first portion of the range when in the first mode.

In any of the above drivers, the range of variable speeds to which the driver is accelerated, as managed by the control circuitry, is proportional to the degree of actuation of the at least one pedal through the first portion of the range but is not proportional from the first portion of the range to the second portion of the range.

In any of the above drivers, the at least one pedal can be actuatable by being tiltable through an angular range, and the at least one sensor can be configured to output the one or more signals based on a degree of forward tilt of the at least one pedal.

Any of the above drivers can further include a speed sensor configured to output a signal indicative of a current measured speed of the driver.

In any of the above drivers, the control circuitry can be configured to determine a target forward speed based on an amount of forward tilt of the at least one pedal as indicated by the one or more signals of the pedal sensor, increase delivery of driving power to the electric motor if the target forward speed is greater than the current speed of the driver as indicated by the signal of the speed sensor, and decrease delivery of driving power to the electric motor if the target forward speed is less than the current speed of the driver as indicated by the signal of the speed sensor.

In any of the above drivers, the control circuitry can be configured to determine a target reverse speed based on an amount of rearward tilt of the at least one pedal as indicated by the one or more signals of the pedal sensor, increase delivery of driving power to the electric motor if the target reverse speed is greater than the current speed of the driver as indicated by the signal of the speed sensor, and decrease delivery of driving power to the electric motor if the target reverse speed is less than the current speed of the driver as indicated by the signal of the speed sensor.

A method of operating a battery powered driver of a ground surface modifying machine in a speed control mode includes engaging the speed control mode, selecting a forward speed set point using a speed control input, actuating a pedal of the driver in a forward direction into a forward angular range, actuating the pedal through a forward speed range associated with the forward angular range to accelerate the driver forward, the power delivered to the electric motor for forward acceleration proportional to a degree of actuation of the pedal within the forward speed range, and actuating the pedal to an angular degree associated with the forward speed set point, the forward speed set point representing a maximum forward speed of the driver in the speed control mode.

The method of the preceding paragraph can optionally include, additionally and/or alternatively, any one or more of the following features, configurations and/or additional components:

In the above method, engaging the speed control mode can include actuating a speed control switch to an ON position.

In any of the above methods, the speed control input can be a potentiometer or digital input configured to send a forward speed signal to control circuitry of the driver.

In any of the above methods, the forward angular range can represent an angular tilt range of the pedal from a neutral position to a maximum extent of the pedal.

In any of the above methods, the angular degree associated with the forward speed set point can lie between the neutral position and the maximum extent of the pedal.

In any of the above methods, the forward speed range can represent the angular range of the pedal between the neutral position and the forward speed set point.

In any of the above methods, actuating the pedal forward through the forward speed range can continuously increase a speed of the driver.

In any of the above methods, a forward speed set point range can represent the angular range of the pedal between the forward speed set point and the maximum extent of the pedal.

In any of the above methods, tilting the pedal through the forward speed set point range does not change the speed of the driver.

In any of the above methods, the angular degree associated with the forward speed set point can be the maximum extent of the pedal.

In any of the above methods, the forward speed range can represent the angular range of the pedal between a neutral position and the forward speed set point.

In any of the above methods, the forward speed range can be scaled from a zero speed to a speed of the forward speed set point.

A battery powered driver for propelling a wheeled ground surface modifying machine includes a battery powered electric motor, at least one pedal attached to a pedal axle, the at least one pedal being tiltable with respect to the pedal axle, and a motion control mechanism linked to the at least one pedal. The motion control mechanism includes a dampener mechanically linked to the pedal axle, a linking rod mechanically linked to the pedal axle, and a spring mechanism mechanically linked to the linking rod.

The driver of the preceding paragraph can optionally include, additionally and/or alternatively, any one or more of the following features, configurations and/or additional components:

In the above driver, the at least one pedal can be tiltable from a neutral position in each of a forward and rearward direction.

In any of the above drivers, in the neutral position, the at least one pedal can remain within a range of tilt from horizontal in the forward and rearward directions with respect to a ground surface.

In any of the above drivers, the at least one pedal can include a first pedal and a second pedal, the first and second pedals being disposed on opposing lateral sides of the driver.

In any of the above drivers, the first and second pedals can be mechanically linked to one another via the pedal axle such that the first and second pedals tilt together.

In any of the above drivers, the mechanical motion control can further include a pedal arm rotatably attached to the pedal axle and movable with respect to the at least one pedal, the pedal arm further being attached to a front end of the linking rod, and to a front end of the dampener.

In any of the above drivers, a back end of the dampener can be fixedly attached to a frame of the driver.

In any of the above drivers, the dampener can be extendable and compressible in the forward and rearward directions, respectively.

In any of the above drivers, the dampener can include a housing with at least one chamber, and a fluid within the housing.

In any of the above drivers, the back end of the linking rod can be mechanically linked to the spring via a plate.

In any of the above drivers, the spring can be configured to restore the at least one pedal to the neutral position absent an opposing force applied to the at least one pedal.

In any of the above drivers, the at least one wheel can include a first wheel and a second wheel, and the first and second wheels can be the only wheels of the driver to contact a ground surface during operation of the driver.

In any of the above drivers, the driver can be without a steering mechanism.

In any of the above drivers, the driver can further include a hitch for connecting the driver to the ground surface modifying machine, the driver configured to push the ground surface modifying machine forward, and pull the ground surface modifying machine rearward, via the hitch.

A battery powered driver for propelling a wheeled ground surface modifying machine includes at least one wheel mounted on a wheel axle, a bay for housing at least one battery and positioned above the wheel axle, and a seat positioned above and at least partially covering the bay. The seat is movable away from the bay.

The driver of the preceding paragraph can optionally include, additionally and/or alternatively, any one or more of the following features, configurations and/or additional components:

In the above driver, the at least one wheel can include a first wheel and a second wheel, and the first and second wheels can be the only wheels of the driver to contact a ground surface during operation of the driver.

In any of the above drivers, the driver can be without a steering mechanism.

In any of the above drivers, the seat can include a base portion parallel with the ground surface in an operational position.

In any of the above drivers, the seat can be tiltable in a forward direction such that the base portion is no longer parallel with the ground surface.

In any of the above drivers, the seat can further include an upright back portion.

In any of the above drivers, the driver can further include a hitch for connecting the driver to the ground surface modifying machine, the driver configured to push the ground surface modifying machine forward, and pull the ground surface modifying machine rearward, via the hitch.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A battery powered driver for propelling a wheeled ground surface modifying machine, the driver comprising:
   at least one wheel contacting a ground surface;
   a battery-powered electric motor;
   control circuitry configured to manage delivery of electrical battery power to the electric motor to control a speed of the driver;
   at least one pedal attached to a pedal axle, the at least one pedal being tiltable about the pedal axle in each of a forward and rearward direction with respect to a horizontal position of the pedal, the at least one pedal having a neutral position in which the at least one pedal is within a degree of tilt from the horizontal position in the forward and rearward directions with respect to the ground surface;
   a pedal arm fixed with respect to the pedal axle such that the pedal arm rotates with the pedal axle;
   at least one pedal tilt sensor configured to output one or more signals to the control circuitry indicating a degree of tilt of the at least one pedal; and
   a motion control mechanically linked to the at least one pedal, the motion control comprising:
      a dampener that absorbs energy to slow the motion of the at least one pedal; and
      a spring configured to restore the at least one pedal to the neutral position absent an opposing force applied to the at least one pedal;
   wherein the motion control, including the dampener and the spring, is located below the pedal;
   wherein the pedal arm extends downward from the axle to connect with the motion control so that the motion control regulates motion of the pedal through the pedal arm;
   wherein the control circuitry is configured to:
      control the electric motor to accelerate the driver forward based on the one or more signals indicating a forward tilt of the at least one pedal beyond the neutral position, the electrical battery power delivered to the electric motor for forward acceleration proportional to a degree of forward tilt of the at least one pedal; and
      control the electric motor to accelerate the driver rearward based on the one or more signals indicating a rearward tilt of at least one pedal beyond the neutral position, the electrical battery power delivered to the electric motor for rearward acceleration proportional to a degree of rearward tilt of the at least one pedal;
      wherein the control circuitry is configured to not deliver driving power to the electric motor for accelerating the driver forward or rearward when the at least one pedal is in the neutral position.

2. The driver of claim 1, wherein the at least one pedal comprises a first pedal and a second pedal, the first and second pedals being disposed on opposing lateral sides of the driver.

3. The driver of claim 2, wherein the first and second pedals are mechanically linked to one another via the pedal axle such that the first and second pedals tilt together.

4. The driver of claim 1, wherein the at least one pedal tilt sensor comprises a potentiometer that outputs the one or more signals based on the direction and degree of tilt of the at least one pedal.

5. The driver of claim 1, wherein the range includes 5 degrees of forward or rearward tilt of the pedal from horizontal.

6. The driver of claim 1 and further comprising:
   a speed sensor configured to output a speed signal indicative of a current measured speed of the driver.

7. The driver of claim 6, wherein the control circuitry is configured to:
   determine a target forward speed based on the degree of forward tilt of the at least one pedal as indicated by the one or more signals;
   increase delivery of driving power to the electric motor if the target forward speed is greater than the current speed of the driver as indicated by the speed signal; and
   decrease delivery of driving power to the electric motor if the target forward speed is less than the current speed of the driver as indicated by the speed signal.

8. The driver of claim 7, wherein the control circuitry is further configured to:
   determine a target reverse speed based on the degree of rearward tilt of the at least one pedal as indicated by the one or more signals;
   increase delivery of driving power to the electric motor if the target reverse speed is greater than the current speed of the driver as indicated by the speed signal; and
   decrease delivery of driving power to the electric motor if the target reverse speed is less than the current speed of the driver as indicated by the speed signal.

9. The driver of any of claim 8 and further comprising:
   a speed control input configured to output a set point signal to the control circuitry, the set point signal indicating a forward speed set point;
   wherein the forward speed set point is a non-zero value and less than a maximum forward speed at which the control circuitry will cause the driver to be accelerated to by the electric motor based on a maximum forward tilt position of the at least one pedal.

10. The driver of claim 9, wherein the control circuitry is configured to remap a forward speed range based on the forward speed set point, the forward speed range corresponding to a range of forward speeds that can be indicated based on a proportional forward tilt of the at least one pedal.

11. The driver of claim 10, wherein the control circuitry is configured to remap the forward speed range by setting the current target forward speed to the forward speed set point based on the at least one pedal being tilted past a threshold angle associated with the forward speed set point.

12. The driver of claim 11, wherein the control circuitry is configured to remap the forward speed range by substituting a truncated forward speed range and a forward speed set point range for the forward speed range when determining the target forward speed, the forward speed set point range corresponding to greater forward tilt of the at least one pedal as compared to the truncated forward speed range.

13. The driver of claim 12, wherein the control circuitry is further configured to:
   proportionally increase the target forward speed as the at least one pedal further tilts through the truncated forward speed range; and
   maintain the target forward speed at a level corresponding to the forward speed set point despite forward or rearward tilting of the at least one pedal within the forward speed set point range.

14. The driver of claim 10, wherein the control circuitry is configured to remap the forward speed range by setting a speed associated with the forward speed set point as the maximum forward speed of the forward speed range and rescaling the rest of the forward speed range based on the speed associated with the forward speed set point.

15. The driver of claim 1, wherein the at least one wheel comprises a first wheel and a second wheel, and wherein the first and second wheels are the only wheels of the driver that contact the ground surface during operation of the driver.

16. The driver of claim 1, wherein the driver does not include a steering mechanism.

17. The driver of claim 1 and further comprising:
a hitch for connecting the driver to the ground surface modifying machine, the driver configured to push the ground surface modifying machine forward, and pull the ground surface modifying machine rearward, via the hitch.

18. The driver of claim 1, wherein the dampener comprises a housing with at least one chamber, and a fluid within the housing.

19. The driver of claim 1, wherein a back end of the dampener is fixedly attached to a frame of the driver.

* * * * *